United States Patent
Ohta et al.

(10) Patent No.: US 11,513,270 B2
(45) Date of Patent: Nov. 29, 2022

(54) OPTICAL BODY

(71) Applicant: Dexerials Corporation, Tokyo (JP)

(72) Inventors: Eiji Ohta, Tokyo (JP); Tsutomu Nagahama, Tokyo (JP); Shigehisa Ohkawara, Tokyo (JP); Tatsuya Harimara, Tokyo (JP); Katsuhiro Doi, Tokyo (JP); Kazuhiko Noda, Tokyo (JP); Akihiro Shibata, Tokyo (JP); Kazuo Goto, Tokyo (JP); Yasuyuki Kudo, Tokyo (JP)

(73) Assignee: Dexerials Corporation, Tokyo (JP)

( * ) Notice: Subject to any disclaimer, the term of this patent is extended or adjusted under 35 U.S.C. 154(b) by 288 days.

(21) Appl. No.: 16/753,161

(22) PCT Filed: Oct. 2, 2018

(86) PCT No.: PCT/JP2018/036948
§ 371 (c)(1),
(2) Date: Apr. 2, 2020

(87) PCT Pub. No.: WO2019/069953
PCT Pub. Date: Apr. 11, 2019

(65) Prior Publication Data
US 2020/0241186 A1 Jul. 30, 2020

(30) Foreign Application Priority Data

Oct. 5, 2017 (JP) .............................. JP2017-194943
Oct. 1, 2018 (JP) .............................. JP2018-186824

(51) Int. Cl.
*G02B 5/28* (2006.01)
*E06B 9/24* (2006.01)

(52) U.S. Cl.
CPC ................ *G02B 5/282* (2013.01); *E06B 9/24* (2013.01); *E06B 2009/2417* (2013.01)

(58) Field of Classification Search
CPC ... G02B 5/282; E06B 9/24; E06B 2009/2417; F21S 11/007
See application file for complete search history.

(56) References Cited

U.S. PATENT DOCUMENTS 5,559,634 A 9/1996 Weber
9,810,818 B2 * 11/2017 Wang .................... G02B 5/045
(Continued)

FOREIGN PATENT DOCUMENTS

CN 101061397 10/2007
CN 101221257 7/2008
(Continued)

OTHER PUBLICATIONS

Notice of Reasons for Rejection dated Jan. 25, 2022 issued for corresponding Japanese application No. JP 2018-186824.
(Continued)

*Primary Examiner* — Christopher E Mahoney
(74) *Attorney, Agent, or Firm* — Carmody Torrance Sandak & Hennessey LLP

(57) ABSTRACT

An optical body including: a first optical layer which has a surface having a convex profile in which a plurality of one-directionally extending elongated convex portions are one-dimensionally aligned in one direction; an inorganic layer disposed on the surface of the first optical layer on a side having the convex profile and a second optical layer disposed on a side of the inorganic layer so that the convex profile is embedded; wherein the convex profile meets at least one of the following (1) to (4):
(1) a height varies in an extending direction in each of the elongated convex portions,
(2) a ridge portion meanders in a direction perpendicular to both the extending direction and a height direction of the convex portion in each of the elongated convex portions,
(Continued)

(3) heights of the elongated convex portions adjacent to each other are different from each other, and
(4) a triangular prism-shaped convex portion and an elongated convex portion having a curved surface are adjacent to each other.

5 Claims, 25 Drawing Sheets

(56) References Cited

U.S. PATENT DOCUMENTS

| | | | | |
|---|---|---|---|---|
| 9,846,265 | B2* | 12/2017 | Ehrensperger | G02B 5/0289 |
| 10,422,497 | B2* | 9/2019 | Hoffend, Jr. | G02B 5/126 |
| 10,466,395 | B1* | 11/2019 | Northcott | G02B 5/26 |
| 10,831,092 | B2* | 11/2020 | Schiavoni | B32B 17/06 |
| 2006/0109687 | A1 | 5/2006 | Campbell | |
| 2008/0123018 | A1 | 5/2008 | Ahn et al. | |
| 2008/0291541 | A1* | 11/2008 | Padiyath | G02B 5/0231 |
| | | | | 359/569 |
| 2011/0310487 | A1 | 12/2011 | Nagahama et al. | |

FOREIGN PATENT DOCUMENTS

| | | |
|---|---|---|
| JP | 2004-078234 | 3/2004 |
| JP | 2008-146025 | 6/2008 |
| JP | 2008-521054 | 6/2008 |
| JP | 2010-020132 | 1/2010 |
| JP | 2010-224528 | 10/2010 |
| JP | 2011-128512 | 6/2011 |
| JP | 2012-003027 | 1/2012 |

OTHER PUBLICATIONS

Chinese Patent Office, First Office Action issued in corresponding Chinese Patent Application No. 201880064656.6 dated Jul. 5, 2021.
International Search Report dated Dec. 18, 2018 issued in corresponding International Patent Application No. PCT/JP2018/036948.
Written Opinion of the International Search Authority dated Dec. 18, 2018 issued in corresponding International Patent Application No. PCT/JP2018/036948.

* cited by examiner

OPTICAL BODY

TECHNICAL FIELD

The present invention relates to an optical body.

BACKGROUND ART

Recently, optical films aiming at imparting various effects such as absorption or reflection of incident light have been widely known. These optical films have various configurations depending on the intended function. One of the configurations has a concave-convex interface therein and includes a thin film formed on the interface. For example, PTL 1 discloses, as the optical film having the configuration, a retroreflective polarizer which includes a first base material having a concave-convex surface on which a plurality of prisms are one-dimensionally aligned, a laminate film formed on the concave-convex surface, and a second base material formed on the laminate film.

One example of a concave-convex profile of the optical film is one in which a plurality of one-directionally extending elongated convex portions are one-dimensionally aligned in one direction, as illustrated in FIGS. 3A to 3C of PTL 2. Heights of the elongated convex portions are the same at any position and distances between the ridges of the convex portions adjacent to each other are the same at any position.

CITATION LIST

Patent Literature

PTL 1 Japanese Patent Application Laid-Open (JP-A) No. 2004-78234
PTL 2 Japanese Patent Application Laid-Open (JP-A) No. 2011-128512

SUMMARY OF INVENTION

Technical Problem

The optical film having the profile described above is, for example, disposed on a windowpane as a heat-ray reflecting film which retroreflects sunlight so that the convex portions are one-dimensionally aligned in a direction parallel to a horizontal direction.

When the optical film is disposed in such a manner, light incident from the sun, for example, light incident downwards from the southeast is reflected upwards to the southwest. This reflected light is locally reflected sunlight, which serves as a light source. Therefore, in the case of heat-ray retroreflecting films, heat-rays are reflected. If there are buildings in a direction to which the reflected light linearly travels, the buildings are exposed to the heat-rays, leading to heat damage.

When the reflected light is visible light, the glare may impair a view of the scenery from a window.

Therefore, at present, there is a need to reduce intense local regular reflection in an optical body.

An object of the present invention is to provide an optical body having a convex profile in which a plurality of one-directionally extending elongated convex portions are one-dimensionally aligned in one direction and being capable of reducing intense local regular reflection.

Solution to Problem

Means for solving the above-described problems are as follows.

<1> An optical body including:
a first optical layer which has a surface having a convex profile in which a plurality of one-directionally extending elongated convex portions are one-dimensionally aligned in one direction;
an inorganic layer disposed on the surface of the first optical layer on a side having the convex profile and
a second optical layer disposed on a side of the inorganic layer so that the convex profile is embedded;
wherein the convex profile meets at least one of the following (1) to (4);
(1) a height varies in an extending direction in each of the elongated convex portions,
(2) a ridge portion meanders in a direction perpendicular to both the extending direction and a height direction of the convex portion in each of the elongated convex portions,
(3) heights of the elongated convex portions adjacent to each other are different from each other, and
(4) a triangular prism-shaped convex portion and an elongated convex portion having a curved surface are adjacent to each other.
<2> The optical body according to <1>,
wherein the inorganic layer is a wavelength selective reflecting layer.
<3> The optical body according to <1>,
wherein the inorganic layer is semitransparent.
<4> The optical body according to any one of <1> to <3>,
wherein the first optical layer and the second optical layer have transparency.
<5> The optical body according to any one of <1> to <4>,
wherein the optical body is bonded to a windowpane in use.

Advantageous Effects of the Invention

The present invention can provide an optical body having a convex profile in which a plurality of one-directionally extending elongated convex portions are one-dimensionally aligned in one direction and being capable of reducing intense local regular reflection.

DESCRIPTION OF EMBODIMENTS (Optical Body)

An optical body of the present invention includes at least a first optical layer, an inorganic layer, and a second optical layer; and, if necessary, further includes other members.

When a conventional optical film 100A having a convex profile in which a plurality of one-directionally extending elongated convex portions are one-dimensionally aligned in one direction is disposed on a windowpane so that the convex portions are one-dimensionally aligned in a direction parallel to a horizontal direction, light incident from the sun 101 onto a windowpane 100 is usually regularly reflected. As a result, at a position at which the light incident onto the windowpane 100, the light is reflected to the sky around a direction in which one-directionally extending elongated convex portions are aligned (FIGS. 1A and 1B).

Figure 1A:
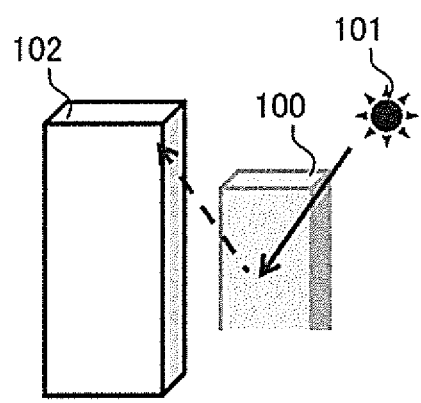
FIG. 1A is a view illustrating a state in which sunlight is reflected by a windowpane on which an optical film having a heat-ray retroreflective configuration illustrated in FIG. 3A is bonded (part 1).
Figure 1B:
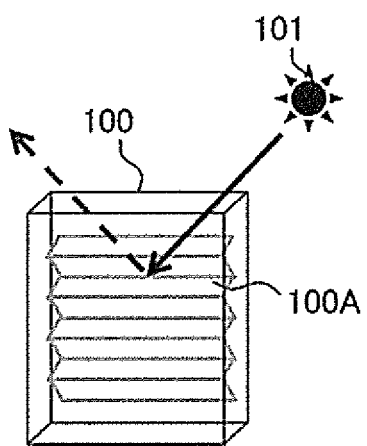
FIG. 1B is a view illustrating a state in which sunlight is reflected by a windowpane on which an optical film having a heat-ray retroreflective configuration illustrated in FIG. 3A is bonded (part 2).

In such a case, sun beams are locally reflected (FIGS. 1A and 1B). As a result, if there is an adjacent building 102, the building 102 is exposed to beams reflected in the above-described manner. Therefore, when heat-rays are reflected, the thus-reflected heat-rays are irradiated on positions where sunlight originally does not enter or where sunlight enters in the building 102, leading to heat damage (FIG. 1A).

The present inventors conducted extensive studies. As a result, the present inventors have been completed the present invention by finding that intense local regular reflection can be reduced by disturbing homogeneity in a convex profile in which a plurality of one-directionally extending elongated convex portions are one-dimensionally aligned in one direction in an optical body, specifically, allowing the convex profile in which a plurality of one-directionally extending elongated convex portions are one-dimensionally aligned in one direction in the optical body to meet at least one of the following (1) to (4):

(1) a height varies in an extending direction in each of the elongated convex portions,
(2) a ridge portion meanders in a direction perpendicular to both the extending direction and a height direction of the convex portion in each of the elongated convex portions,
(3) heights of the elongated convex portions adjacent to each other are different from each other, and
(4) a triangular prism-shaped convex portion and an elongated convex portion having a curved surface are adjacent to each other.

Figure 2A:
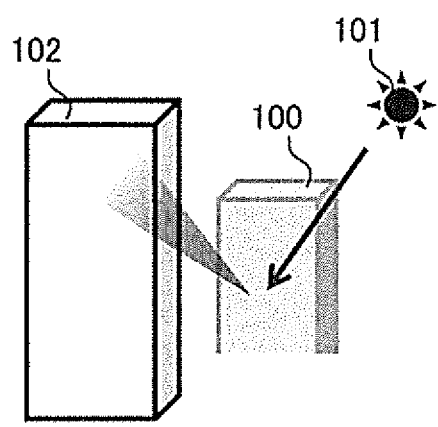
FIG. 2A is a view illustrating a state in which sunlight is reflected by a windowpane on which an optical film having a heat-ray retroreflective configuration illustrated in FIG. 4A is bonded (part 1).
Figure 2B:
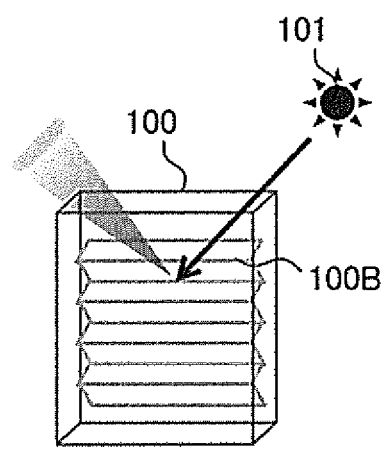
FIG. 2B is a view illustrating a state in which sunlight is reflected by a windowpane on which an optical film having a heat-ray retroreflective configuration illustrated in FIG. 4A is bonded (part 2).

When an optical film 100B of the present invention having a convex profile in which a plurality of one-directionally extending elongated convex portions are one-dimensionally aligned in one direction and which meets at least one of the above (1) to (4) is disposed on a windowpane so that the convex portions are one-dimensionally aligned in a direction parallel to a horizontal direction, light incident from the sun 101 onto the windowpane 100 is reflected to the sky around a direction in which one-directionally extending elongated convex portions are aligned, at a position at which the light incident onto the windowpane 100 (FIGS. 2A and 2B).

In such a case, usually, sun beams are intensely locally reflected (FIGS. 1A and 1B). Meanwhile, when the optical film 100B of the present invention is used, the local regular reflection is reduced (FIGS. 2A and 2B). Therefore, even if there is an adjacent building 102, the building 102 less tends to undergo heat damage.

An embodiment in which the convex profile meets at least one of the above (1) to (4) will now be described with reference to one exemplary production method.

First, a conventional first optical layer will be described.

Figure 3A:
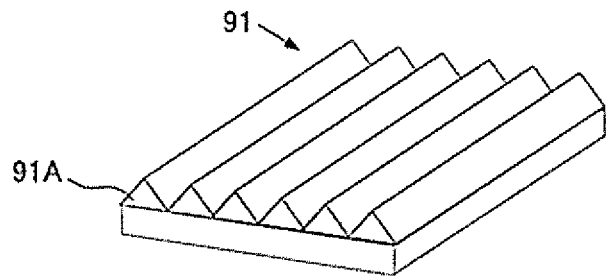
FIG. 3A is a perspective view illustrating a conventional first optical layer.
Figure 3B:
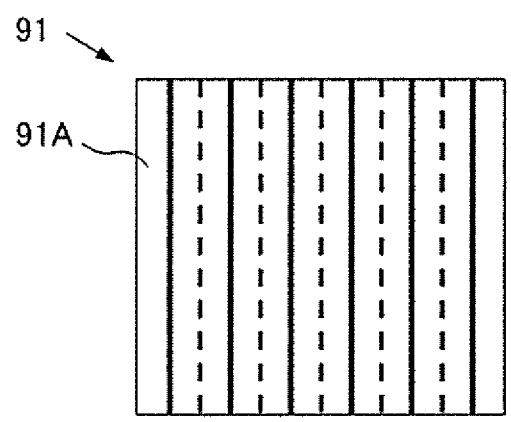
FIG. 3B is a top view illustrating a conventional first optical layer.

FIG. 3A is a perspective view illustrating a conventional first optical layer 91. FIG. 3B is a top view illustrating a conventional first optical layer 91.

In the first optical layer 91 illustrated in FIGS. 3A and 3B, a plurality of one-directionally extending elongated convex portions 91A are one-dimensionally aligned in one direction.

In FIG. 3B, bold solid straight lines represent ridges of the elongated convex portions 91A and broken lines represents valley bottoms between the elongated convex portions.

As illustrated in FIGS. 3A and 3B, in the conventional first optical layer 91, a height of the elongated convex portion 91A is identical everywhere and a distance between ridges of convex portions adjacent to each other is also identical everywhere.

The first optical layer 91 in FIGS. 3A and 3B is, for example, produced as follows.

The first optical layer 91 is produced by transferring a convex profile formed on a master material.

Figure 3C:
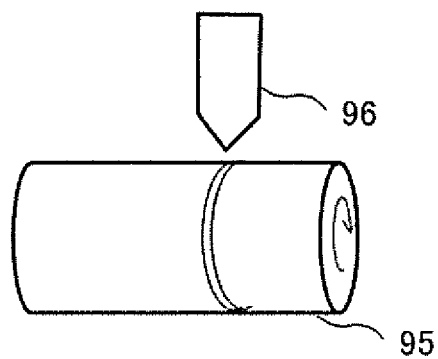
FIG. 3C is a schematic diagram illustrating a master material and a carving tool for producing the first optical layer in FIGS. 3A and 3B.
Figure 3D:
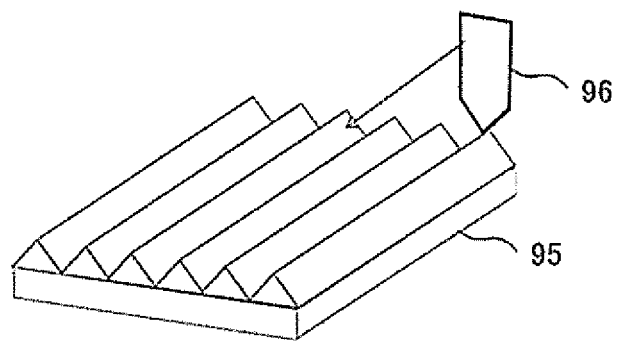
FIG. 3D is a perspective view illustrating the master material in FIG. 3C illustrated in a plate-like form.

As illustrated in FIG. 3C, a master material 95 is, for example, in a roll form. The master material 95 is carved by allowing the master material 95 to rotate while a carving tool 96 having a tip with a predetermined shape is in contact with the master material 95 so as to carve the master material to a predetermined depth. The master material 95 is carved while the master material rotates once. Thereafter, the carving tool 96 is moved by a predetermined distance in a direction orthogonal to a rotation direction and then the master material 95 is carved again. At this time, a carved depth is set to the same as the above-described depth. These procedures are repeated. Thus, the master material 95 on which a predetermined convex profile are formed is obtained. FIG. 3D is a perspective view illustrating the master material 95 illustrated in a plate-like form.

Alternatively, when the master material 95 in the roll form is rotated while the carving tool 96 having a tip with a predetermined shape is in contact with the master material 95 so as to carve the master material 95 to a predetermined depth, the number of rotation of the roll and a movement distance of the carving tool may be determined so that the master material is spirally carved, making it possible to continuously and also efficiently process the master material.

The convex profile on the master material 95 is transferred on a sheet of resin by pressing the master material 95 onto a sheet of uncured resin or pressing the sheet of uncured resin onto the master material 95. Then, the sheet of resin is allowed to cure. Thus, the first optical layer can be obtained.

Next, a first optical layer according to one aspect of the present invention will be described.

Figure 4A:
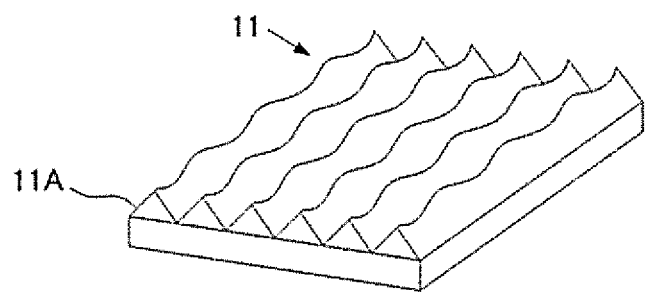
FIG. 4A is a perspective view illustrating one exemplary first optical layer of an optical body of the present invention.
Figure 4B:
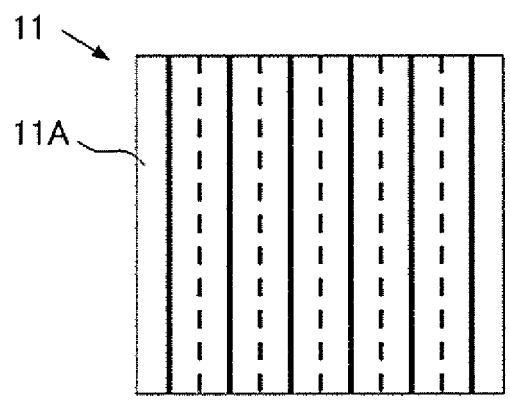
FIG. 4B is a top view illustrating one exemplary first optical layer of an optical body of the present invention.

In a first optical layer 11 illustrated in FIGS. 4A and 4B, a plurality of one-directionally extending elongated convex portions 11A are one-dimensionally aligned in one direction.

In FIG. 4B, bold solid straight lines represent ridges of the elongated convex portions 11A and broken lines represents valley bottoms between the elongated convex portions.

As illustrated in FIGS. 4A and 4B, in the first optical layer 11 according to one aspect of the present invention, a height of the elongated convex portion 11A continuously varies. Note that, in the top view in FIG. 4B, both of the ridges and the valley bottoms are represented by straight lines.

The first optical layer 11 in FIGS. 4A and 4B is, for example, produced as follows.

The first optical layer 11 is produced by transferring a convex profile formed on a master material.

Figure 4C:
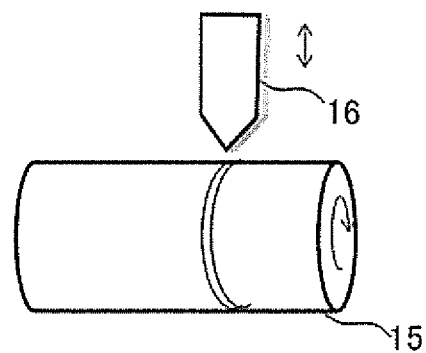
FIG. 4C is a schematic diagram illustrating a master material and a carving tool for producing the first optical layer in FIGS. 4A and 4B.
Figure 4D:
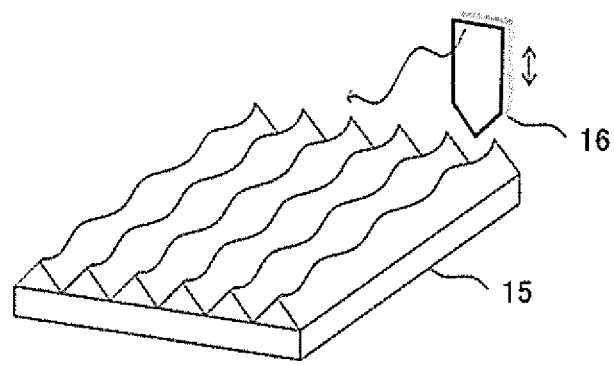
FIG. 4D is a perspective view illustrating the master material in FIG. 4C illustrated in a plate-like form.

As illustrated in FIG. 4C, a master material 15 is, for example, in a roll form. The master material 15 is carved by allowing the master material 15 to rotate while a carving tool 16 having a tip with a predetermined shape is in contact with the master material 15. Carved grooves of which carved depth continuously varies are obtained by moving vertically the carving tool 16 during carving. The master material 15 is carved while the master material rotates once. Thereafter, the carving tool 16 is moved by a predetermined distance in a direction orthogonal to a rotation direction and then the master material 15 is carved again. At this time, the master material is carved so that the carving tool 16 is moved vertically in the same rhythm as the previous carving. That is, the carving tool is moved vertically in the same rhythm so that a plurality of the thus-produced carved grooves have the same carved depth in a direction orthogonal to a rotation direction of the master material 15. These procedures are repeated. Thus, the master material 15 having a convex profile in which each of the elongated convex portions has a continuously varying height is obtained. The ridges of the elongated convex portions are straight liner when viewed from above because the carving tool is moved vertically at the same rhythm. FIG. 4D is a perspective view illustrating the master material 15 illustrated in a plate-like form.

Note that, the carving tool 16 may be moved vertically by means of driving means such as piezoelectric elements and solenoid actuators.

The convex profile on the master material 15 is transferred on a sheet of resin by pressing the master material 15 onto a sheet of uncured resin or pressing the sheet of uncured resin onto the master material 15. Then, the sheet of resin is allowed to cure. Thus, the first optical layer 11 can be obtained.

In place of the above-described transfer method, the first optical layer 11 may also be obtained as follows. A mold (replica) on which the convex profile of the master material 15 has been transferred to provide a reversed profile thereof is produced. The convex profile of the master material 15 is transferred on a sheet of resin by pressing the mold onto a sheet of uncured resin. Then, the sheet of resin is allowed to cure.

Next, a first optical layer according to another aspect of the present invention will be described.

Figure 5A:
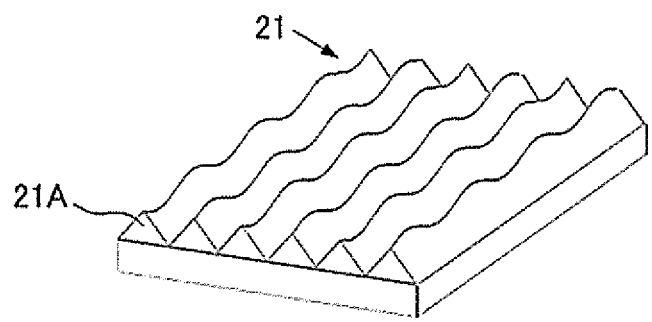
FIG. 5A is a perspective view illustrating another exemplary first optical layer of an optical body of the present invention.
Figure 5B:
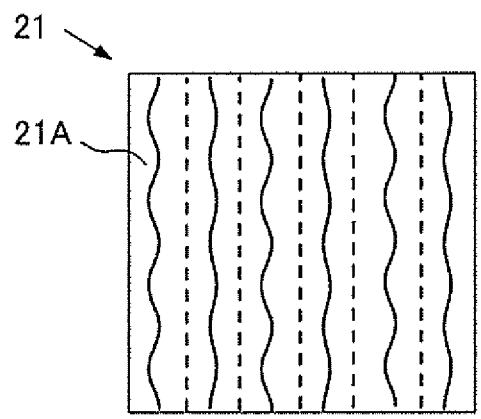
FIG. 5B is a top view illustrating another exemplary first optical layer of an optical body of the present invention.

In a first optical layer 21 illustrated in FIGS. 5A and 5B, a plurality of one-directionally extending elongated convex portions 21A are one-dimensionally aligned in one direction.

In FIG. 5B, bold solid wavy lines represent ridges of the elongated convex portions 21A and broken lines represents valley bottoms between the elongated convex portions.

As illustrated in FIGS. 5A and 5B, in the first optical layer 21 according to one aspect of the present invention, a height of the elongated convex portion 21A continuously varies. Note that, in the top view in FIG. 5B, the ridges meander but the valley bottoms are straight lines.

The first optical layer 21 in FIGS. 5A and 5B is, for example, produced as follows.

The first optical layer 21 is produced by transferring a convex profile formed on a master material.

Figure 5C:
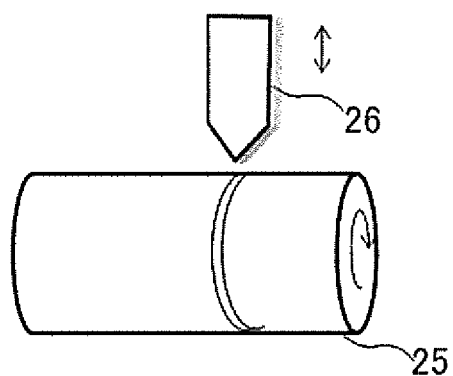
FIG. 5C is a schematic diagram illustrating a master material and a carving tool for producing the first optical layer in FIGS. 5A and 5B.
Figure 5D:
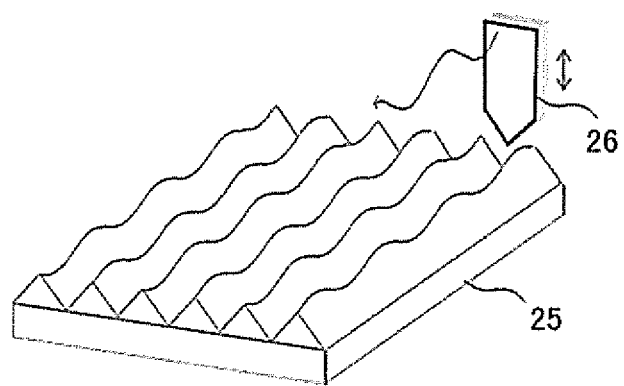
FIG. 5D is a perspective view illustrating the master material in FIG. 5C illustrated in a plate-like form.

As illustrated in FIG. 5C, a master material 25 is, for example, in a roll form. The master material 25 is carved by allowing the master material 25 to rotate while a carving tool 26 having a tip with a predetermined shape is in contact with the master material 25. Carved grooves of which carved depth continuously varies are obtained by moving vertically the carving tool 26 during carving. The master material 25 is carved while the master material rotates once. Thereafter, the carving tool 26 is moved by a predetermined distance in a direction orthogonal to a rotation direction and then the master material 25 is carved again. At this time, the master material is carved while the carving tool 26 is moved vertically in a different rhythm from the previous carving. That is, the rhythm in which the carving tool is moved vertically is shifted so that the thus-produced carved grooves do not always have the same depth in a direction orthogonal to a rotation direction of the master material 25. These procedures are repeated. Thus, the master material 25 having a convex profile in which each of the elongated convex portions has a continuously varying height is obtained. The ridges of the elongated convex portions meander and are wavy when viewed from above because the carving tool is moved vertically at the different rhythm. FIG. 5D is a perspective view illustrating the master material 25 illustrated in a plate-like form.

Alternatively, when the master material 25 in the roll form is rotated while the carving tool 26 having a tip with a predetermined shape is in contact with the master material 25 so as to carve the master material 25 to a predetermined depth, the number of rotation of the roll and a movement distance of the carving tool may be determined so that the master material is spirally carved, making it possible to continuously and also efficiently process the master material. At this time, the carving tool 26 is moved vertically in the different rhythm so that the thus-produced carved grooves do not always have the same depth in a direction orthogonal to a rotation direction of the master material 25. Thus, the carved grooves illustrated in FIG. 5D are obtained.

A mold (replica) on which the convex profile of the master material 25 has been transferred to provide a reversed profile thereof is produced. The convex profile of the master material 25 is transferred on a sheet of resin by pressing the mold onto a sheet of uncured resin. Then, the sheet of resin is allowed to cure. Thus, the first optical layer 21 can be obtained.

Note that, the first optical layer 21 may also be obtained as follows. The convex profile of the master material 25 is transferred on a sheet of resin by pressing the master material 25 onto a sheet of uncured resin or pressing the sheet of uncured resin onto the master material 25. Then, the sheet of resin is allowed to cure. However, in this case, the top view of the first optical layer 21 have solid lines and broken lines exchanged with those illustrated in FIG. 5B. That is, the ridges of the elongated convex portions are straight liner when viewed from above, and the valley bottoms between the elongated convex portions meander and are wavy when viewed from above.

Next, a first optical layer according to another aspect of the present invention will be described.

Figure 6A:
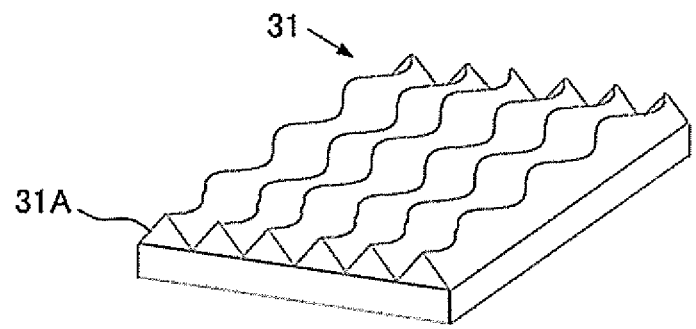
FIG. 6A is a perspective view illustrating another exemplary first optical layer of an optical body of the present invention.
Figure 6B:
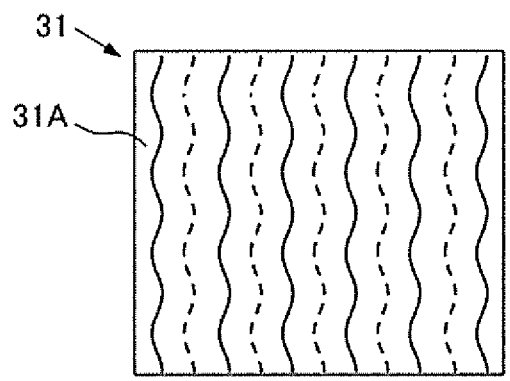
FIG. 6B is a top view illustrating another exemplary first optical layer of an optical body of the present invention.

In a first optical layer 31 illustrated in FIGS. 6A and 6B, a plurality of one-directionally extending elongated convex portions 31A are one-dimensionally aligned in one direction.

In FIG. 6B, bold solid wavy lines represent ridges of the elongated convex portions 31A and broken lines represents valley bottoms between the elongated convex portions.

As illustrated in FIGS. 6A and 6B, in the first optical layer 31 according to one aspect of the present invention, a height of each of the elongated convex portions 31A is constant. However, a ridge in each of the elongated convex portions 31A meanders in a direction orthogonal to an extending direction and a height direction. Note that, in the top view in FIG. 6B, both of the ridges and the valley bottoms meander.

The first optical layer 31 in FIGS. 6A and 6B is, for example, produced as follows.

The first optical layer 31 is produced by transferring a convex profile formed on a master material.

Figure 6C:
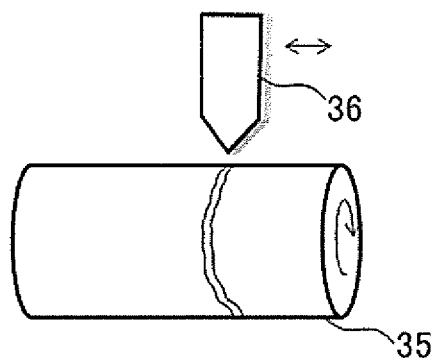
FIG. 6C is a schematic diagram illustrating a master material and a carving tool for producing the first optical layer in FIGS. 6A and 5B.
Figure 6D:
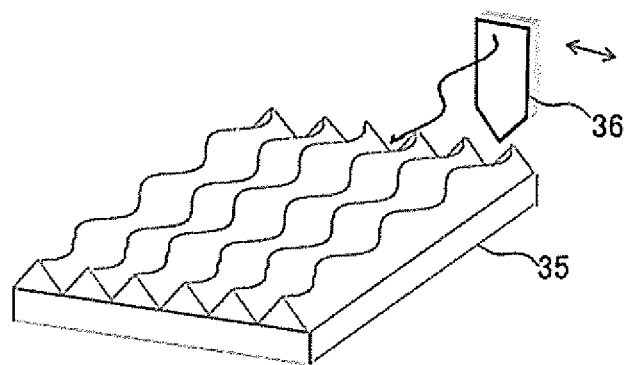
FIG. 6D is a perspective view illustrating the master material in FIG. 6C illustrated in a plate-like form.

As illustrated in FIG. 6C, a master material 35 is, for example, in a roll form. The master material 35 is carved by allowing the master material 35 to rotate while a carving tool 36 having a tip with a predetermined shape is in contact with the master material 35. Meandering carved grooves each of which carved depth is constant are obtained by moving horizontally the carving tool 36 during carving. The master material 35 is carved while the master material rotates once. Thereafter, the carving tool 36 is moved by a predetermined distance in a direction orthogonal to a rotation direction and then the master material 35 is carved again. At this time, the carving tool is moved horizontally in the same rhythm as the previous carving. That is, the carving tool is moved horizontally in the same rhythm so that a plurality of the thus-produced carved grooves meander in a similar manner from the start to the end of carving. These procedures are repeated. Thus, the master material 35 having a convex profile in which each of the elongated convex portions 31A have a ridge meandering in a direction orthogonal to an extending direction and a height direction is obtained. In this master material 35, each of the elongated convex portions 31A has a constant height. FIG. 6D is a perspective view illustrating the master material 35 illustrated in a plate-like form.

The convex profile on the master material 35 is transferred on a sheet of resin by pressing the master material 35 onto a sheet of uncured resin or pressing the sheet of uncured resin onto the master material 35. Then, the sheet of resin is allowed to cure. Thus, the first optical layer 31 can be obtained.

In place of the above-described transfer method, the first optical layer 31 may also be obtained as follows. A mold (replica) on which the convex profile of the master material 35 has been transferred to provide a reversed profile thereof is produced. The convex profile of the master material 35 is transferred on a sheet of resin by pressing the mold onto a sheet of uncured resin. Then, the sheet of resin is allowed to cure.

Next, a first optical layer according to another aspect of the present invention will be described.

Figure 7A:
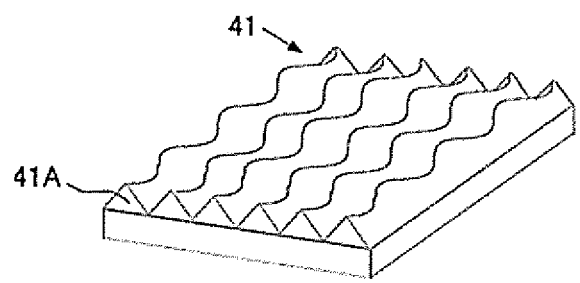
FIG. 7A is a perspective view illustrating another exemplary first optical layer of an optical body of the present invention.
Figure 7B:
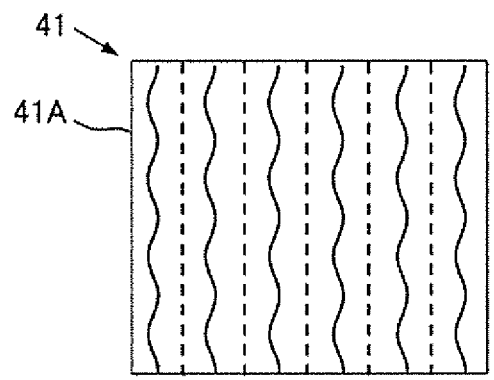
FIG. 7B is a top view illustrating another exemplary first optical layer of an optical body of the present invention.

In a first optical layer 41 illustrated in FIGS. 7A and 7B, a plurality of one-directionally extending elongated convex portions 41A are one-dimensionally aligned in one direction.

In FIG. 7B, bold solid wavy lines represent ridges of the elongated convex portions 41A and broken lines represents valley bottoms between the elongated convex portions.

As illustrated in FIGS. 7A and 7B, in the first optical layer 41 according to one aspect of the present invention, a height of each of the elongated convex portions 41A is constant. However, a ridge in each of the elongated convex portions 41A meanders in a direction orthogonal to an extending direction and a height direction. Note that, in the top view in FIG. 7B, the ridges meander but the valley bottoms are straight liner.

The first optical layer 41 in FIGS. 7A and 7B is, for example, produced as follows.

The first optical layer 41 is produced by transferring a convex profile formed on a master material.

Figure 7C:
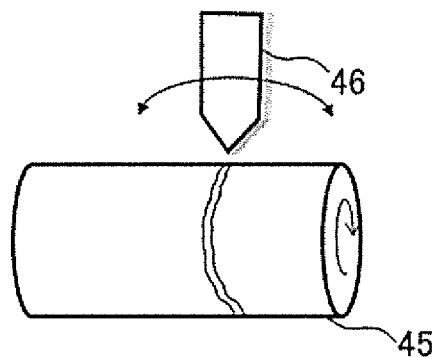
FIG. 7C is a schematic diagram illustrating a master material and a carving tool for producing the first optical layer in FIGS. 7A and 7B.
Figure 7D:
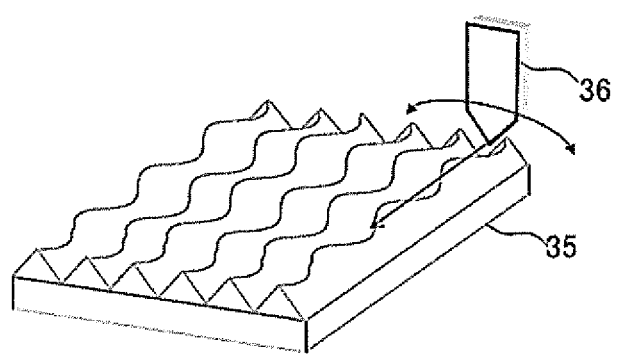
FIG. 7D is a perspective view illustrating the master material in FIG. 7C illustrated in a plate-like form.

As illustrated in FIG. 7C, a master material 45 is, for example, in a roll form. The master material 45 is carved by allowing the master material 45 to rotate while a carving tool 46 having a tip with a predetermined shape is in contact with the master material 45. Meandering carved grooves of which carved tops are straight liner are obtained by moving pendularly the carving tool 46 about the carved tops during carving. The master material 45 is carved while the master material rotates once. Thereafter, the carving tool 46 is moved by a predetermined distance in a direction orthogonal to a rotation direction and then the master material 45 is carved again. At this time, the carving tool is moved pendularly in the same rhythm as the previous carving. That is, the carving tool is moved pendularly in the same rhythm so that a plurality of the thus-produced carved grooves meander in a similar manner from the start to the end of carving. These procedures are repeated. Thus, the master material 45 having a convex profile in which each of the elongated convex portions 41A has a ridge meandering in a direction orthogonal to an extending direction and a height direction is obtained. In this master material 45, each of the elongated convex portion 41A has a constant height. FIG. 7D is a perspective view illustrating the master material 45 illustrated in a plate-like form.

A mold (replica) on which the convex profile of the master material 45 has been transferred to provide a reversed profile thereof is produced. The convex profile of the master material 45 is transferred on a sheet of resin by pressing the mold onto a sheet of uncured resin. Then, the sheet of resin is allowed to cure. Thus, the first optical layer 41 can be obtained.

Next, a first optical layer according to another aspect of the present invention will be described.

Figure 8A:
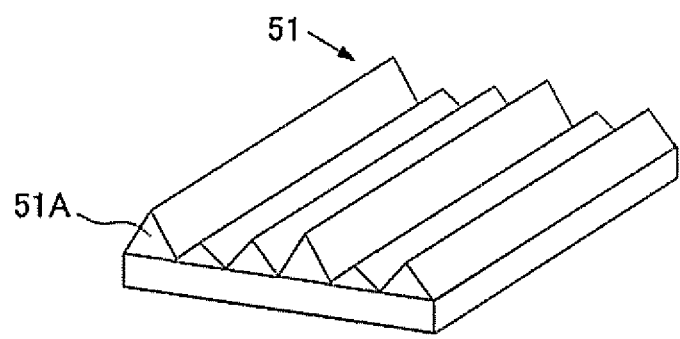
FIG. 8A is a perspective view illustrating another exemplary first optical layer of an optical body of the present invention.
Figure 8B:
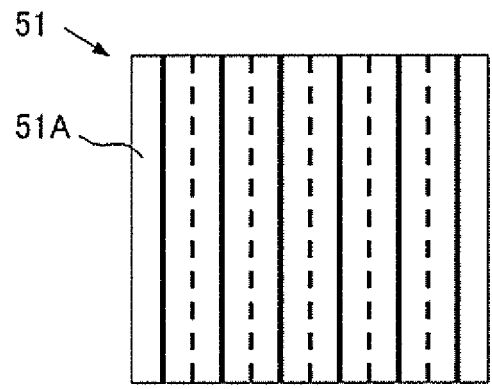
FIG. 8B is a top view illustrating another exemplary first optical layer of an optical body of the present invention.

In a first optical layer 51 illustrated in FIGS. 8A and 8B, a plurality of one-directionally extending elongated convex portions 51A are one-dimensionally aligned in one direction.

In FIG. 8B, bold solid straight lines represent ridges of the elongated convex portions 51A and broken lines represents valley bottoms between the elongated convex portions.

As illustrated in FIGS. 8A and 8B, in the first optical layer 51 according to one aspect of the present invention, heights of the elongated convex portions 51A adjacent to each other are different from each other. Note that, in the top view in FIG. 8B, both of the ridges and the valley bottoms are straight liner.

The first optical layer 51 in FIGS. 8A and 8B is, for example, produced as follows.

The first optical layer 51 is produced by transferring a convex profile formed on a master material.

Figure 8C:
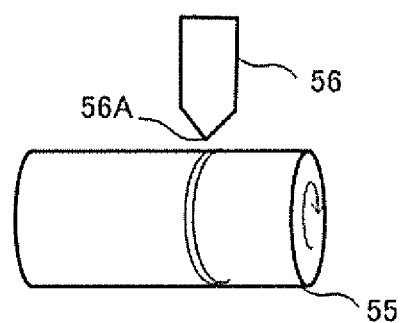
FIG. 8C is a schematic diagram illustrating a master material and a carving tool for producing the first optical layer in FIGS. 8A and 8B.
Figure 8D:
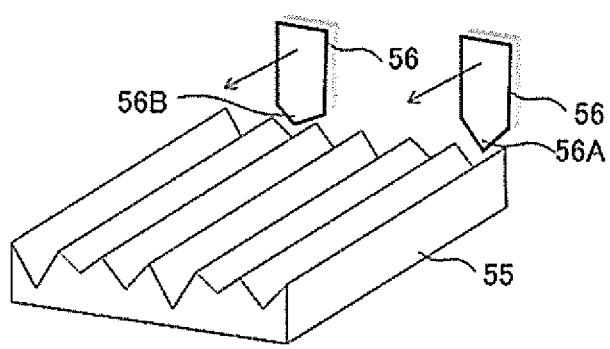
FIG. 8D is a perspective view illustrating the master material in FIG. 8C illustrated in a plate-like form.

As illustrated in FIG. 8C, a master material 55 is, for example, in a roll form. The master material 55 is carved by allowing the master material 55 to rotate while a carving tool 56 having a tip 56A with a predetermined shape is in contact with the master material 55. The master material 55 is carved while the master material rotates once and then the carving tool 56 is moved by a predetermined distance in a direction orthogonal to a rotation direction. From this position, the master material 55 is carved again using the carving tool 56 having a tip 56B with a different shape from the tip 56A. These procedures are repeated. Thus, the master material 55 having a convex profile in which the elongated convex portions 51A adjacent to each other have different heights from each other is obtained. FIG. 8D is a perspective view illustrating the master material 55 illustrated in a plate-like form.

The convex profile on the master material 55 is transferred on a sheet of resin by pressing the master material 55 onto a sheet of uncured resin and then the sheet of resin is allowed to cure. Thus, the first optical layer 51 can be obtained.

Next, a first optical layer according to another aspect of the present invention will be described.

Figure 9A:
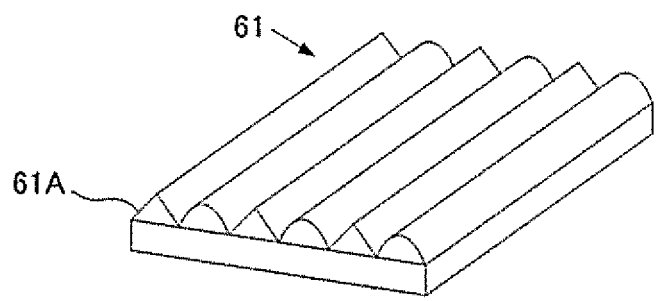
FIG. 9A is a perspective view illustrating another exemplary first optical layer of an optical body of the present invention.
Figure 9B:
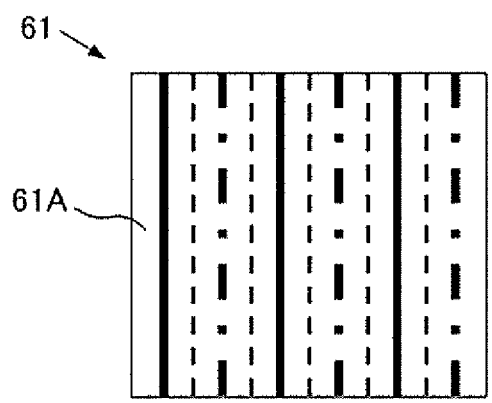
FIG. 9B is a top view illustrating another exemplary first optical layer of an optical body of the present invention.

In a first optical layer 61 illustrated in FIGS. 9A and 9B, a plurality of one-directionally extending elongated convex portions 61A are one-dimensionally aligned in one direction.

In FIG. 9B, bold solid straight lines represent ridges of triangular prism-shaped convex portions, bold long dashed short dashed straight lines represents ridges of elongated convex portions each having a curved surface, and broken lines represents valley bottoms between the elongated convex portions.

As illustrated in FIGS. 9A and 9B, in the first optical layer 61 according to one aspect of the present invention, a triangular prism-shaped convex portions and an elongated convex portion having a curved surface are adjacent to each other.

The first optical layer 61 in FIGS. 9A and 9B is, for example, produced as follows.

The first optical layer 61 is produced by transferring a convex profile formed on a master material.

Figure 9C:
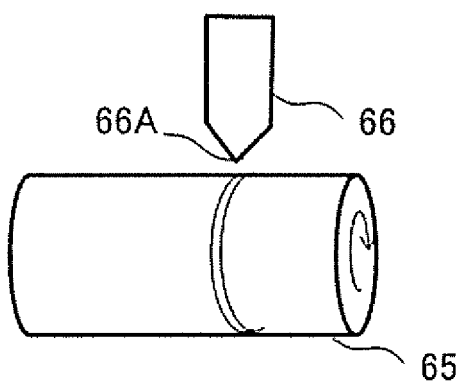
FIG. 9C is a schematic diagram illustrating a master material and a carving tool for producing the first optical layer in FIGS. 9A and 9B.
Figure 9D:
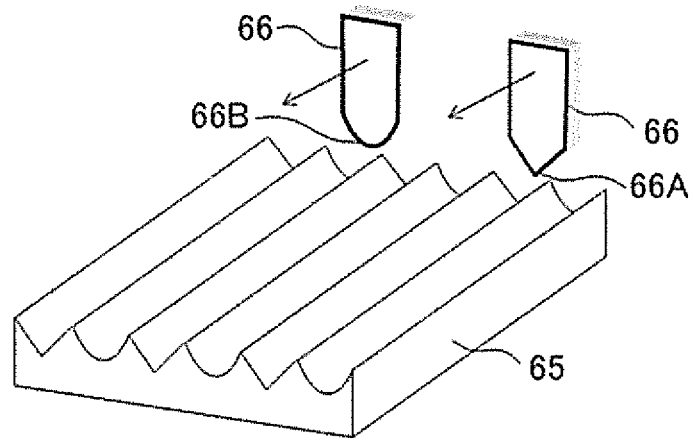
FIG. 9D is a perspective view illustrating the master material in FIG. 9C illustrated in a plate-like form.

As illustrated in FIG. 9C, a master material 65 is, for example, in a roll form. The master material 65 is carved by allowing the master material 65 to rotate while a carving tool 66 having a tip 66A with a predetermined triangular shape is in contact with the master material 65. The master material 65 is carved while the master material rotates once and then the carving tool is moved by a predetermined distance in a direction orthogonal to a rotation direction. From this position, the master material 65 is carved again using the carving tool 66 having a tip 66B with a curved shape different from that of the tip 66A. These procedures are repeated. Thus, the master material 65 having a convex profile in which triangular prism-shaped convex portions and elongated convex portions having curved surfaces are adjacent to each other is obtained. FIG. 9D is a perspective view illustrating the master material 65 illustrated in a plate-like form.

A mold (replica) on which the convex profile of the master material 65 has been transferred to provide a reversed profile thereof is produced. The convex profile of the master material 65 is transferred on a sheet of resin by pressing the mold onto a sheet of uncured resin. Then, the sheet of resin is allowed to cure. Thus, the first optical layer 61 can be obtained.

<First Optical Layer>

The first optical layer has a surface having a convex profile in which a plurality of one-directionally extending elongated convex portions are one-dimensionally aligned in one direction.

The first optical layer supports and protects an inorganic layer formed on a concave-convex surface.

The first optical layer has a convex profile as described above. That is, the convex profile meet at least one of the following (1) to (4):
(1) a height varies in an extending direction in each of the elongated convex portions,
(2) a ridge portion meanders in a direction perpendicular to both the extending direction and a height direction of the convex portion in each of the elongated convex portions,
(3) heights of the elongated convex portions adjacent to each other are different from each other, and
(4) a triangular prism-shaped convex portion and an elongated convex portion having a curved surface are adjacent to each other.

An average value of heights of the convex portions on the first optical layer is not particularly limited and may be appropriately selected depending on the intended purpose. The average value is preferably from 5 μm to 1,000 μm, more preferably from 10 μm to 300 μm, particularly preferably from 20 μm to 100 μm.

Figure 10A:
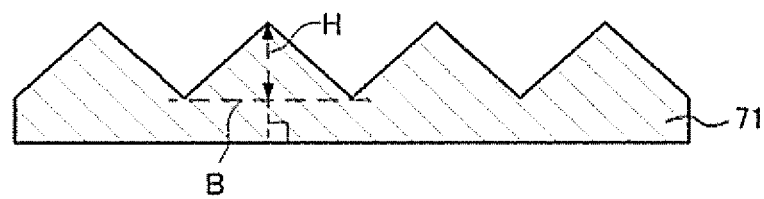
FIG. 10A is a cross-sectional view illustrating a height of a convex portion in a first optical layer (part 1).
Figure 10B:
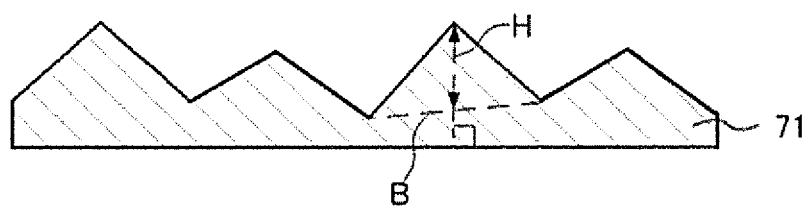
FIG. 10B is a cross-sectional view illustrating a height of a convex portion in a first optical layer (part 2).

The height will now be described with reference to drawings. FIGS. 10A and 10B are schematic cross-sectional views of the first optical layer in a direction orthogonal to a direction in which a plurality of the convex portions are one-dimensionally aligned.

The height (H) refers to a height from a bottom to a ridge of the convex portion in a cross section of the first optical layer 71 in the direction orthogonal to a direction in which a plurality of the convex portions are one-dimensionally aligned, as illustrated in FIGS. 10A and 10B. The bottom (B) of the convex portion corresponds to a virtual line which connects two valleys sandwiching the convex portion. The height (H) is, in a perpendicular line from the ridge of the convex portion to a plane of the first optical layer 71, a distance from the ridge of the convex portion to an intersection point of the perpendicular line and the bottom (B) of the convex portion.

An average value of distances (pitches) between a plurality of convex portions on the first optical layer is not particularly limited and may be appropriately selected depending on the intended purpose. The average distance is preferably 10 μm to 3,000 μm, more preferably 20 μm to 900 μm, further preferably 40 μm to 300 μm, particularly preferably 45 μm to 90 μm.

Figure 11A:
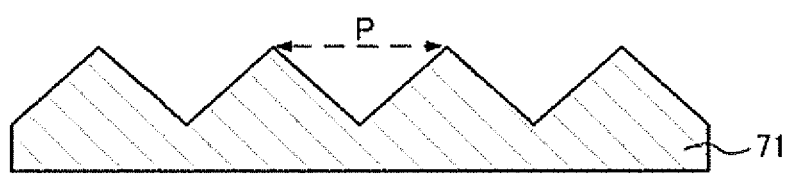
FIG. 11A is a cross-sectional view illustrating a distance (pitch) between convex portions adjacent to each other in a first optical layer (part 1).
Figure 11B:
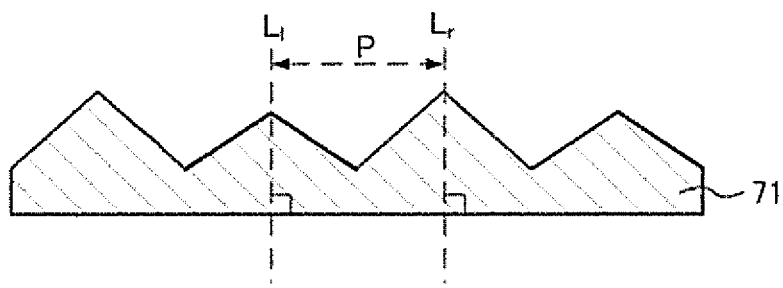
FIG. 11B is a cross-sectional view illustrating a distance (pitch) between convex portions adjacent to each other in a first optical layer (part 2).

The average value will now be described with reference to drawings. FIGS. 11A and 11B are schematic cross-sectional views of the first optical layer in a direction orthogonal to a direction in which a plurality of the convex portions are one-dimensionally aligned.

The distance (pitch) (P) refers to a distance between the ridges of the convex portions adjacent to each other in a cross section of the first optical layer 71 in the direction orthogonal to a direction in which a plurality of the convex portions are one-dimensionally aligned, as illustrated in FIGS. 11A and 11B. When the ridges of the convex portions adjacent to each other have different heights from each other, the distance (pitch) (P) refers to a distance between a perpendicular line ($L_1$) from a ridge of one convex portion to a plane of the first optical layer 71 and a perpendicular line ($L_r$) from a ridge of another convex portion adjacent to the one convex portion to the plane of the first optical layer 71.

The height and the distance may be determined by, for example, observing an electron micrograph of the cross-sectional view.

The average values may be determined by measuring at any 50 positions on the convex profile meeting at least one of the above (1) to (4).

A shape of the convex portion is, for example, triangular in a cross section orthogonal to an extending direction.

<Case in Which the Convex Profile Meets (1)>

In the case where the convex profile meets the above (1), the average height (AH) of each of the elongated convex portions may be, for example, from 15 μm to 45 μm or from 25 μm to 35 μm.

In the case where the convex profile meets the above (1), for example, the height of each of the elongated convex portions varies periodically. A period (Pe) for which the height varies may be, for example, from 400 μm to 1,200 μm, from 600 μm to 1,000 μm, or from 700 μm to 900 μm.

In the case where the convex profile meets the above (1), for example, the height of each of the elongated convex portions varies periodically. An amplitude (A) for which the height varies is preferably from 5 μm to 65 μm from the viewpoint of reducing local reflection of upward reflection. Given that processability for producing a master material and an inflow of resin components into the master material in addition to reduction of the local reflection of upward reflection, the amplitude (A) is more preferably from 5 μm to 40 μm, particularly preferably 10 μm to 30 μm.

In the case where the convex profile meets the above (1), a ratio of the amplitude (A) to the period (Pe) [amplitude (μm)/period(μm)] is preferably from 0.6% to 7.8%, and, from the viewpoints of reducing the local reflection of upward reflection and the processability, more preferably from 0.6% to 5.0%, particularly preferably 1.2% to 3.8%.

For a variation range of the amplitude, for example, a sine wave; or a wavy curved line of which curvature gradually increases, such as a cycloid curve and an involute curve; or a curved line of a combination of high-ordered higher harmonic sine waves; or any combination thereof may be applied. An inclination angle (E) at which a variation is maximum is preferably in a range of from 1.1 deg to 13.7 deg. The range larger than the above range is undesired because the inclination angle is larger than a carving angle when the master material is carved with an edge of a carving blade being bit therein, so that the carving blade damages the master material after processing. Therefore, the range is preferably from 1.1 deg to 13.7 deg, more preferably from 1.1 deg to 9.9 deg, particularly preferably from 2.2 deg to 6.7 deg also from the viewpoint of processability of the master material.

Moreover, a deviation (ΔPh) in a periodical variation of heights in the elongated convex portions adjacent to each other is preferably from ¼ period to ¾ period, more preferably from ⅓ period to ⅔ period, further preferably from ⅖ period to ⅗ period, particularly preferably ½ period.

The average height (AH), the amplitude (A), the period (Pe), the inclination angle (E) at which a variation is maximum, and the deviation in a periodical variation (ΔPh) will now be described with reference to drawings.

Figure 18A:
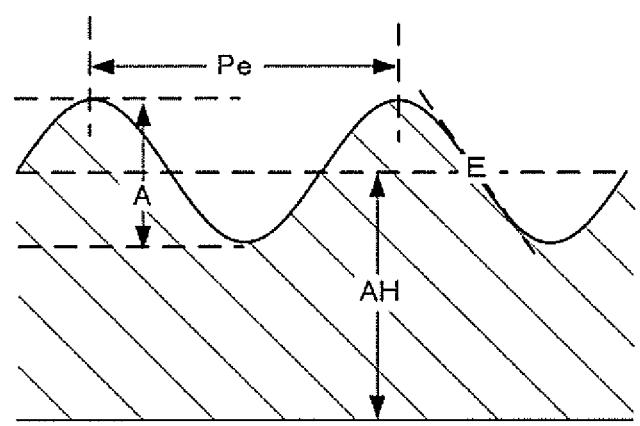
FIG. 18A is a diagram for describing an average height (AH), an amplitude (A), a period (Pe), and an inclination angle (E) at which a variation is maximum.

FIG. 18A is a diagram for describing the average height (AH), the amplitude (A), the period (Pe), and the inclination angle (E) at which a variation is maximum. This figure is a cross-sectional view of the elongated convex portion when viewed from a direction orthogonal to an extending direction and a thickness direction.

The average height (AH) refers to an average value of distances from the bottom of the convex portion to the height of the convex portion.

The amplitude (A) refers to a difference between the maximum height and the minimum height of varying height.

The period (Pe) refers to a period for the height varies.

The inclination angle (E) at which a variation is maximum refers to a differential value in variation of the height at a position at which a variation in height is maximum.

Figure 18B:
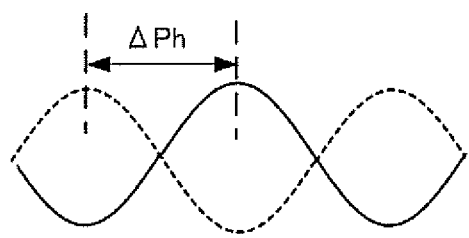
FIG. 18B is a diagram for describing a deviation of a periodical variation ($\Delta$Ph).

FIG. 18B is a diagram for describing the deviation of a periodical variation (ΔPh).

In FIG. 18B, a solid curved line represents a ridgeline of a first elongated convex portion and a broken curved line represents a ridgeline of a second elongated convex portion adjacent to the first elongated convex portion.

The deviation of a periodical variation (ΔPh) refers to a deviation of a periodical variation in heights of two elongated convex portions adjacent to each other. In FIG. 18B, the deviation of a periodical variation (ΔPh) is ½ period.
<Case in Which the Convex Profile Meets (2)>

In the case where the convex profile meets the above (2), the average height (AH) of each of the elongated convex portions may be, for example, from 15 μm to 45 μm or from 25 μm to 35 μm.

In the case where the convex profile meets the above (2), for example, the ridge meanders periodically. A period (Peb) for which the ridge meanders may be, for example, from 400 μm to 1,200 μm, from 600 μm to 1,000 μm, or from 700 μm to 900 μm.

In the case where the convex profile meets the above (2), for example, the ridge meanders periodically. An amplitude (Ab) for which the ridge meanders is preferably from 5 μm to 65 μm from the viewpoint of reducing local reflection of upward reflection. Given that processability for producing a master material and an inflow of resin components into the master material in addition to reduction of the local reflection of upward reflection, the amplitude (Ab) is more preferably from 5 μm to 40 μm, particularly preferably 10 μm to 30 μm.

In the case where the convex profile meets the above (2), a ratio of the amplitude (Ab) to the period (Peb) (amplitude/period) is preferably from 0.6% to 7.8%, and, from the viewpoints of reducing the local reflection of upward reflection and the processability, more preferably from 0.6% to 5.0%, particularly preferably 1.2% to 3.8%.

For a variation range of the meandering, for example, a sine wave; or a wavy curved line of which curvature gradually increases, such as a cycloid curve and an involute curve; or a curved line of a combination of high-ordered higher harmonic sine waves; or any combination thereof may be applied. An inclination angle (Eb) at which a variation is maximum is preferably in a range of from 1.1 deg to 13.7 deg. The range larger than the above range is undesired because the inclination angle is larger than a carving angle when the master material is carved with an edge of a carving blade being bit therein, so that the carving blade damages the master material after processing. Therefore, the range is preferably from 1.1 deg to 13.7 deg, more preferably from 1.1 deg to 9.9 deg, particularly preferably from 1.1 deg to 6.7 deg also from the viewpoint of processability of the master material.

Moreover, a deviation (ΔPhb) in a periodical variation of meanderings in the elongated convex portions adjacent to each other is preferably from ¼ period to ¾ period, more preferably from ⅓ period to ⅔ period, further preferably from ⅖ period to ⅗ period, particularly preferably ½ period.

The amplitude (Ab), the period (Peb), the inclination angle (Eb) at which a variation is maximum, and the deviation (ΔPhb) in a periodical variation will now be described with reference to drawings.

Figure 19:
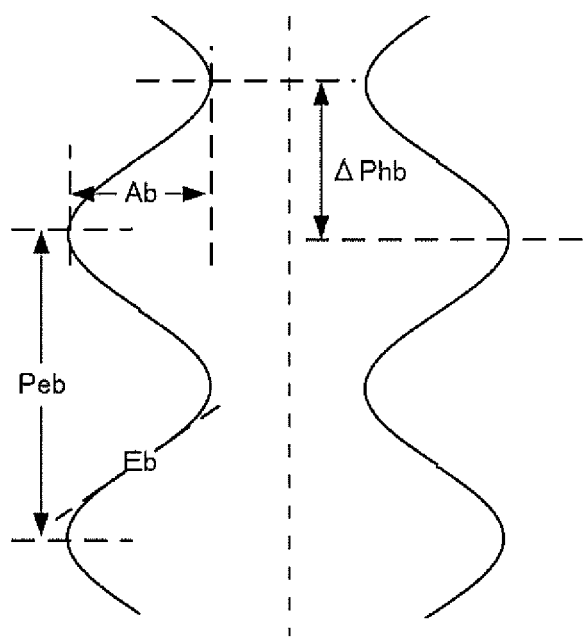
FIG. 19 is a diagram for describing an amplitude (Ab), a period (Peb), an inclination angle (Eb) at which a variation is maximum, and a deviation of a periodical variation ($\Delta$Phb).

FIG. 19 is a diagram for describing the amplitude (Ab), the period (Peb), the inclination angle (Eb) at which a variation is maximum, and the deviation (ΔPhb) in a periodical variation. This figure is a top view of the elongated convex portion when viewed from above.

In FIG. 19, a solid curved line represents a ridgeline of the elongated convex portion and a long dashed short dashed line represents a valley bottom between two convex portions.

The amplitude (Ab) refers to a width of meandering.

The period (Peb) refers to a period for the meandering varies.

The inclination angle (Eb) at which a variation is maximum refers to a differential value in variation of the meandering at a position at which a variation in meandering is maximum.

In FIG. 19, the deviation (ΔPhb) in a periodical variation is ½ period.
<Case in Which the Convex Profile Meets (3)>

In the case where the convex profile meets the above (3), an absolute value of a difference in heights of the elongated convex portions adjacent to each other is preferably from 5

μm to 65 μm, more preferably from 5 μm to 40 μm, particularly preferably 5 μm to 30 μm.

The variation in height in the (1), the meandering in the (2), the difference in height in the (3), and an array of the triangular prism-shaped convex portion and the elongated convex portion having a curved surface in the (4) are preferably periodical. The reason why is as follows.

For variation of structural bodies (convex portions), random arrangement is acceptable. However, as a result of the random arrangement, in the case where high structural bodies and low structural bodies are arranged repeatedly, once light is reflected by one of the high structural bodies, the light transmits a transparent resin over a long distance until the light hits another high structural body again. This may cause an increase in a rate of absorption and thus a decrease in a reflection efficiency. Especially in the case of a windowpane for the purpose of heat-ray retroreflection, the increase in the rate of absorption increases a temperature locally, potentially leading to a risk of "heat-cracking" phenomenon due to a defect which the windowpane has originally had. In order to reduce the risk of "heat-cracking," it is desirable to allow the light to reflect in a shorter route and to reduce ununiformity in height of a reflection structural body. From this viewpoint, such failure can be reduced by, for example, varying the reflection structural bodies periodically.

An inclined plane of the convex portion is preferably inclined at an angle of 45° or more in order not to impair solar reflection efficiency. In the case of gentle inclination, the light is primarily reflected in a similar manner to reflection on a plane, making it possible to obtain a retroreflective property by multiple times of reflection.

In the optical body, the first optical layer may have the predetermined convex profile over the entire one surface thereof, or the first optical layer may have the predetermined convex profile on a portion of one surface thereof. When the first optical layer has the predetermined convex profile on a portion of one surface thereof, the predetermined convex profile is preferably provided on a region on which intense local regular reflection is desired to be reduced.

One aspect of the optical body of the present invention in which only one-dimensionally aligned convex portions are present on one surface of the first optical layer has been described. However, another aspect of the optical body of the present invention in which a two-dimensional alignment formed by combining two of the above-described one-dimensional alignments are provided on one surface of the first optical layer is also possible.

The two-dimensional alignment is formed by combining two of the one-dimensional alignments. The two-dimensional alignment is a two-dimensional alignment in which one one-dimensionally aligned convex profile is combined with the other one-dimensionally aligned convex profile differing in an extending direction and an angle. In this case, one or both of the one-dimensionally aligned convex profiles meet at least one of the following (1) to (4) which have also been described above.

(1) a height varies in an extending direction in each of the elongated convex portions,
(2) a ridge portion meanders in a direction perpendicular to both the extending direction and a height direction of the convex portion in each of the elongated convex portions,
(3) heights of the elongated convex portions adjacent to each other are different from each other, and
(4) a triangular prism-shaped convex portion and an elongated convex portion having a curved surface are adjacent to each other.

In corner-cubic bodies, retroreflection is achieved by reflecting three times on a reflection surface. In the corner-cubic bodies, sunlight tends to be more absorbed due to multiple reflection. Meanwhile, in the case of an optical layer having the two-dimensionally aligned convex profile or only the one-dimensionally aligned convex profile, the number of reflection is decreased, making it possible to prevent sunlight to be absorbed.

In the corner-cubic bodies, retroreflection is achieved by reflecting three times on a reflection surface. In the corner-cubic bodies, a part of light leaks in a non-retroreflection direction through two times of reflection. Meanwhile, in the case of the two-dimensionally aligned convex profile or only the one-dimensionally aligned convex profile, a shape which allows more sunlight to reflect to the sky can be achieved.

The first optical layer may have a property absorbing light of a certain wavelength in a visible region to the extent that transparency for visible light is not impaired, from the viewpoint of imparting aesthetic appearance to optical members or window materials.

Aesthetic appearance, that is, the property absorbing light of a certain wavelength in a visible region may be imparted by, for example, including a pigment in the first optical layer.

The pigment is preferably dispersed in a resin.

The pigment to be dispersed in the resin is not particularly limited and may be appropriately selected depending on the intended purpose. Examples thereof include an inorganic pigment and an organic pigment. An inorganic pigment which having high weather resistance in itself is particularly preferable.

The inorganic pigment is not particularly limited and may be appropriately selected depending on the intended purpose. Examples thereof include zircon gray (Co, Ni doped $ZrSiO_4$), praseodymium yellow (Pr doped $ZrSiO_4$), chrome-titania yellow (Cr, Sb doped $TiO_2$ or Cr, W doped $TiO_2$), chrome green (e.g., $Cr_2O_3$), peacock $((CoZn)O(AlCr)_2O_3)$, Victoria green $((Al, Cr)_2O_3)$, Prussian blue $(CoO.Al_2O_3.SiO_2)$, vanadium-zirconium blue (V doped $ZrSiO_4$), chrome-tin pink (Cr doped $CaO.SnO_2.SiO_2$), manganese pink (Mn doped $Al_2O_3$), and salmon pink (Fe doped $ZrSiO_4$).

The organic pigment is not particularly limited and may be appropriately selected depending on the intended purpose. Examples thereof include an azo pigment and a phthalocyanine pigment.

<<Material of First Optical Layer>>

Examples of materials of the first optical layer include a resin such as a thermoplastic resin, an active energy-ray curable resin, and a thermosetting resin.

The first optical layer has, for example, transparency. The first optical layer is obtained by, for example, allowing a resin composition to cure. The resin composition preferably includes an energy-ray curable resin which is cured by light or electron beam or a thermosetting resin which is cured by heat from the viewpoint of easiness of production. The energy-ray curable resin is preferably photo-sensitive resin composition which is cured by light, and most preferably an ultraviolet curable resin composition which is cured by ultraviolet-rays. The resin composition preferably further contains a phosphate-containing compound, a succinate-containing compound, or a butyrolactone-containing compound from the viewpoint of improvement of adhesiveness between the first optical layer and the inorganic layer. The phosphate-containing compound may be, for example, a phosphate-containing (meth)acrylate, preferably a (meth)acrylic monomer or oligomer having a phosphate group as a functional group. The succinate-containing compound may be, for example, a succinate-containing (meth)acrylate, preferably a (meth)acrylic monomer or oligomer having a succinate group as a functional group. The butyrolactone-containing compound may be, for example, a butyrolactone-containing (meth)acrylate, preferably a (meth)acrylic monomer or oligomer having butyrolactone as a functional group.

The ultraviolet curable resin composition contains, for example, a (meth)acrylate and a photoinitiator. The ultraviolet curable resin composition may further contain a photostabilizer, a flame retardant, a leveling agent, and an antioxidant, if necessary.

The (meth)acrylate is preferably a monomer and/or an oligomer having two or more (meth)acryloyl groups. The monomer and/or the oligomer may be, for example, a urethane (meth)acrylate, an epoxy (meth)acrylate, a polyester (meth)acrylate, a polyol (meth)acrylate, a polyether (meth)acrylate, and a melamine (meth)acrylate. The phrase "(meth)acryloyl group," as used herein, refers to an acryloyl group or a methacryloyl group. The term "oligomer," as used herein, refers to a molecule having a molecular weight of 500 or more but 60,000 or less.

Examples of a polyfunctional monomer which may be used for the ultraviolet curable resin composition include ethanediol diacrylate, 1,3-propanediol diacrylate, 1,4-butanediol diacrylate, 1,6-hexanediol diacrylate, 1,9-nonanediol diacrylate, 1,14-tetradecanediol diacrylate, 1,15-pentadecanediol diacrylate, diethylene glycol diacrylate, polyethylene glycol diacrylate, polypropylene glycol diacrylate, neopentyl glycol diacrylate, 2-butyl-2-ethylpropanediol diacrylate, ethylene oxide-modified bisphenol A diacrylate, polyethylene oxide-modified bisphenol A diacrylate, polyethylene oxide-modified hydrogenated bisphenol A diacrylate, propylene oxide-modified bisphenol A diacrylate, polypropylene oxide-modified bisphenol A diacrylate, hydroxypivalic ester neopentyl glycol ester diacrylate, diacrylate of hydroxypivalic ester neopentyl glycol ester caprolactone adduct, ethylene oxide-modified isocyanuric diacrylate, pentaerythritol diacrylate monostearate, 1,6-hexanediol diglycidyl ether acrylic acid adduct, polyoxyethylene epichlorohydrin-modified bisphenol A diacrylate, tricyclodecane dimethanol diacrylate, tricyclodecane dimethanol dimethacrylate, trimethylol propane triacrylate, ethylene oxide-modified trimethylol propane triacrylate, polyethylene oxide-modified trimethylol propane triacrylate, propylene oxide-modified trimethylol propane triacrylate, polypropylene oxide-modified trimethylol propane triacrylate, pentaerythritol triacrylate, ethylene oxide-modified isocyanurate triacrylate, ethylene oxide-modified glycerol triacrylate, polyethylene oxide-modified glycerol triacrylate, propylene oxide-modified glycerol triacrylate, polypropylene oxide-modified glycerol triacrylate, pentaerythritol tetraacrylate, ditrimethylol propane tetraacrylate, dipentaerythritol tetraacrylate, dipentaerythritol pentaacrylate, dipentaerythritol hexaacrylate, caprolactone-modified dipentaerythritol hexaacrylate, polycaprolactone-modified dipentaerythritol hexaacrylate, dioxane glycol diacrylate, and caprolactone-modified tris(acryloxyethyl) isocyanurate.

The photoinitiator may be appropriately selected from known materials. Examples of the known materials include a benzophenone derivative, an acetophenone derivative, and an anthraquinone derivatives. These may be used alone or in combination. An amount of the photoinitiator to be incorporated is preferably 0.1% by mass or more but 10% by mass or less in solid content. When the amount is less than 0.1% by mass, photocurability may be deteriorated to the extent of being substantially unsuitable for industrial production. Meanwhile, when the amount is more than 10% by mass, a bad smell tend to remain on a coating film if quantity of irradiation light is low. The phrase "solid content," as used herein, refer to all components contained in a cured hardcoat layer. Specifically, for example, a (meth)acrylate and a photoinitiator are referred to as the solid content.

<Inorganic Layer>

The inorganic layer is a layer disposed on the surface of the first optical layer on a side having the convex profile.

The inorganic layer is preferably a reflecting layer which reflects at least near infrared rays. Example of the reflecting layer includes a laminate film as described below. One example of the reflecting layer will be described in detail below.

An average film thickness of the inorganic layer is not particularly limited and may be appropriately selected depending on the intended purpose. The average film thickness is preferably 20 μm or less, more preferably 5 μm or less, further preferably 1 μm or less. When the average film thickness is 20 μm or less, a light path for transmitted light to refract becomes short and therefore a transmission image can be prevented from being distorted.

A method for forming the inorganic layer is not particularly limited and may be appropriately selected depending on the intended purpose. For example, a sputtering method, a vapor deposition method, a dip coating method, or a die coating method may be used.

A type of the inorganic layer is not particularly limited and may be appropriately selected depending on the intended purpose. Examples thereof include a laminate film, a transparent electroconductive layer, a functional layer, and a semitransparent layer. The above-listed examples may be used alone or in combination.

The inorganic layer is, for example, semitransparent.

As used herein, the term "semitransparent" means that transmittance at a wavelength of 500 nm or longer but 1,000 nm or shorter is 5% or more but 70% or less, preferably 10% or more but 60% or less, further preferably 15% or more but 55% or less. The phrase "semitransparent layer" refers to a reflecting layer having transmittance at a wavelength of 500 nm or longer but 1,000 nm or shorter is 5% or more but 70% or less, preferably 10% or more but 60% or less, further preferably 15% or more but 55% or less.

<<Laminate Film>>

The laminate film is not particularly limited and may be appropriately selected depending on the intended purpose. Examples thereof include (i) a laminate film in which low refractive index layers and high refractive index layers having different refractive indexes from each other are alternately laminated; and (ii) a laminate film in which a metal layer having high reflectance in an infrared region, and an optical transparent layer having a high refractive index in the visible region and serving as an anti-reflecting layer or a transparent electroconductive layer are alternately laminated.

Metal Layer

For the metal layer, a metal having high reflectance in an infrared region is used.

The metal having high reflectance in an infrared region is not particularly limited and may be appropriately selected depending on the intended purpose. Examples thereof include single metals such as Au, Ag, Cu, Al, Ni, Cr, Ti, Pd, Co, Si, Ta, W, Mo, and Ge; and alloys including two or more selected from the above-listed single metals. Among them, an Ag-based metal, a Cu-based metal, an Al-based metal, a Si-based metal, and a Ge-based metal are preferable from the viewpoint of practical use.

The alloy is not particularly limited and may be appropriately selected depending on the intended purpose. For example, AlCu, AlTi, AlCr, AlCo, AlNdCu, AlMgSi, AgPdCu, AgPdTi, AgCuTi, AgPdCa, AgPdMg, AgPdFe, Ag, or SiB are preferable.

In order to prevent the metal layer from corroding, a material such as Ti and Nd is preferably added to the metal layer. In particular, when Ag is used as a material of the metal layer, the above-mentioned material is preferably added.

Optical Transparent Layer

The optical transparent layer is an optical transparent layer having a high refractive index in the visible region and serving as an anti-reflecting layer.

A material of the optical transparent layer is not particularly limited and may be appropriately selected depending on the intended purpose. Examples thereof include high dielectrics such as niobium oxide, tantalum oxide, and titanium oxide.

For the purpose of preventing underlying metal from oxidatively deteriorated upon formation of the optical transparent layer, a thin buffer layer made of, for example, Ti having a thickness of about several nanometers may be disposed at an interface of the optical transparent layer to be formed. The phrase "buffer layer," as used herein, refers to a layer which is oxidized upon formation of an upper layer to thereby prevent an underlying layer, such as the metal layer, from oxidizing.

<<Transparent Electroconductive Layer>>

The transparent electroconductive layer is a transparent electroconductive layer which mainly includes an electroconductive material having transparency in the visible region.

The transparent electroconductive layer is not particularly limited and may be appropriately selected depending on the intended purpose. Examples thereof include transparent conductive materials such as tin oxide, zinc oxide, indium tin oxide (ITO), indium zinc oxide (IZO), aluminium-doped zinc oxide (AZO), antimony-doped tin oxide, and a carbon nanotube-containing material.

The transparent electroconductive layer may also be a layer in which nano particles of the transparent conductive material, or nano particles, nano rods, or nano wires of an electroconductive material such as a metal, are dispersed in a resin at a high concentration.

<<Functional Layer>>

The functional layer is a layer which mainly includes a chromic material and which reversibly changes in, for example, reflection performance upon application of an external stimulus.

The chromic material is a material that reversibly changes in structure upon application of an external stimulus such as heat, light, and foreign molecules.

The chromic material is not particularly limited and may be appropriately selected depending on the intended purpose. Examples thereof include a photochromic material, a thermochromic material, a gas chromic material, and an electrochromic material.

The photochromic material is a material which reversibly changes in structure by the action of light.

The photochromic material is a material which reversibly changes in physical properties such as reflectance and color upon irradiation with light such as ultraviolet rays.

The photochromic material is not particularly limited and may be appropriately selected depending on the intended purpose. Examples thereof include transition metal oxides such as $TiO_2$, $WO_3$, $MoO_3$, and $Nb_2O_5$ doped with, for example, Cr, Fe, or Ni. Moreover, wavelength selectivity can be improved by laminating thereon a layer having a different refractive index from that of a layer made of the above-mentioned materials.

The thermochromic material is a material which reversibly changes in structure by the action of heat.

The thermochromic material can reversibly changes in various physical properties such as reflectance and color upon heating.

The thermochromic material is not particularly limited and may be appropriately selected depending on the intended purpose. Examples thereof include $VO_2$. For the purpose of controlling a transition temperature or a transition curve, an element such as W, Mo, and F may be added thereto.

Moreover, the functional layer may have a laminate structure in which a thin film mainly including the thermochromic material such as $VO_2$ is sandwiched between anti-reflecting layers each mainly including a high refractive index material such as $TiO_2$ and ITO.

Alternatively, a photonic lattice such as a cholesteric liquid crystal may be used. The cholesteric liquid crystal can reversibly change in physical properties such as reflectance and color upon heating because the cholesteric liquid crystal can selectively reflect light having a wavelength corresponding to an interlayer gap and the interlayer gap changes depending on a temperature. A reflection band range may be widen using several cholesteric liquid crystal layers having different interlayer gaps from each other.

The electrochromic material a material which reversibly changes in various physical properties such as reflectance and color by the action of electricity.

For example, a material which reversibly changes in structure upon application of voltage may be used as the electrochromic material. The electrochromic material is not particularly limited and may be appropriately selected depending on the intended purpose. Specific examples thereof include a reflective light-modulating material which changes in a reflection property with doping or undoping of, for example, a proton.

Specifically, the reflective light-modulating material is a material of which optical properties may be controlled among a transparent state, a mirror state, and/or an intermediate state therebetween upon application of an external stimulus. The reflective light-modulating material is not particularly limited and may be appropriately selected depending on the intended purpose. Examples thereof an alloy material mainly including a magnesium-nickel alloy material or a magnesium-titanium alloy material, $WO_3$, and a material where acicular crystals are encapsulated in microcapsules.

A specific configuration of the functional layer is not particularly limited and may be appropriately selected depending on the intended purpose. Examples thereof include (1) a configuration in which the above-described alloy layer, a catalyst layer including, for example, Pd, a thin buffer layer made of, for example, Al, an electrolyte layer made of, for example, $Ta_2O_5$, an ion storage layer made of, for example, $WO_3$ including protons, and a transparent electroconductive layer are laminated on a second optical layer and (ii) a configuration in which a transparent electroconductive layer, an electrolyte layer, an electrochromic layer made of, for example, $WO_3$, and a transparent electroconductive layer are laminated on a second optical layer.

In the configurations described above, the alloy layer is doped or undoped with protons included in the electrolyte layer when voltage is applied between the transparent electroconductive layer and an opposed electrode. As a result, the alloy layer is changed in transmittance. In order to enhance wavelength selectivity, the electrochromic material is desirably laminated with a high refractive index material such as $TiO_2$ and ITO.

Another example of the configuration include a configuration in which a transparent electroconductive layer, an optical transparent layer in which microcapsules are dispersed, and a transparent electrode are laminated on a second optical layer. In this configuration, the functionally layer may be turned into a transparent state where the acicular crystals in the microcapsules are uniformly oriented when voltage is applied between both the transparent electrodes, or be turned into a wavelength selective reflection state where the acicular crystals are oriented at random when the voltage is eliminated.

<<Semitransparent Layer>>

The semitransparent layer is formed, for example, of a single metal layer or a plurality of metal layers, and has semitransparency.

A material of the metal layer is not particularly limited and may be appropriately selected depending on the intended purpose. For example, those same as materials of the metal layer for the above-described laminate film may be used.

<Second Optical Layer>

The second optical layer is a layer on which the convex profile is disposed on a side of the inorganic layer and so as to allow the convex profile to be embedded thereinto.

For example, the second optical layer protects the inorganic layer.

A material of the second optical layer may be, for example, the materials exemplified in the description regarding the first optical layer.

One of two major surfaces of the second optical layer is, for example, a smooth surface but the other surface is concaved. The convex profile of the first optical layer and the concave shape of the second optical layer are in a relationship of which concavity and convexity are inversed to each other.

The optical body is, for example, an optical film.

The optical body has transparency. The transparency preferably has a range of transmission image clarity described below. A difference in refractive index between the first optical layer and the second optical layer is preferably 0.010 or less, more preferably 0.008 or less, further preferably 0.005 or less. When the difference in refractive index is more than 0.010, a transmission image tend to look blurred. When the difference in refractive index is in a range of more than 0.008 but 0.010 or less, although it depends on outdoor brightness, there is no hindrance to everyday life. When the difference in refractive index is in a range of more than 0.005 but 0.008 or less, the outdoor sight can be clearly viewed although only a very bright object, such as a light source, causes a displeasing diffraction pattern. When the difference in refractive index is 0.005 or less, a diffraction pattern hardly disturbs a view. Of the first optical layer and the second optical layer, the optical layer to which, for example, a window material is bonded may mainly contain an adhesive. The first optical layer or the second optical layer having such a composition, namely, mainly containing the adhesive allows the optical body and the window material to bond together. Note that, in the case of the composition, the difference in refractive index of the adhesive preferably falls within the above-described range.

The first optical layer and the second optical layer have preferably the same optical properties such as a refractive index. More specifically, the first optical layer and the second optical layer are preferably made of the same material having transparency in the visible region. When the first optical layer and the second optical layer are made of the same material, both optical layers have a refractive index equal to each other, resulting in improvement of the transparency in the visible region. However, even when the optical layers are made of the same starting material, it should be noted that the finally-produced layers may differ in refractive index from each other depending on curing conditions in a film formation step. In contrast, when the first optical layer and the second optical layer are made of different materials from each other, these optical layers are differ in refractive index. As a result, the light is refracted at the inorganic layer (e.g., wavelength selective reflecting layer) serving as a boundary and thus a transmission image tends to blur. Especially when observing an object in the vicinity of a point light source such as lighting in the distance, a diffraction pattern tends to be significantly observed. Note that, the first optical layer and/or the second optical layer may be added with an additive in order to adjust a refractive index value thereof.

The first optical layer and the second optical layer preferably have transparency in the visible region. As used herein, the term "transparency" is defined as having two meanings, i.e., as not absorbing light and not scattering light. Generally speaking, the term may have only the former meaning. However, regarding the optical body, the term preferably contains both the meanings. Currently available retroreflectors are intended to allow a display of light reflected from, for example, traffic signs or clothes for night-shift workers to be visually recognized. Therefore, even when the retroreflectors have a scattering property, the reflected light can be visually recognized as long as the retroreflectors are closely contacted with the underlying reflectors. For example, this is based on the same principle as that images can be visually recognized even when a front surface of an image display device is subjected to an antiglare treatment to impart a scattering property for the purpose of imparting an antiglare property. However, the optical body according to one embodiment preferably does not scatter light because the optical body is characterized by transmitting light other than those having certain wavelengths to be directionally reflected and the optical body is intended to be bonded to a transmission body which mainly transmits light having the above transmission wavelengths in order to observe light transmitted therethrough. However, the second optical layer may be intentionally provided with the scattering property depending on applications.

The optical body is preferably used by bonding together with a rigid body (e.g., window material) having a transmission property mainly for light other than those having certain wavelengths to be transmitted through the optical body using, for example, an adhesive. Examples of the window material include a window material for buildings such as tower buildings and residences and a window material for automobiles. When the optical body is applied to the window material for buildings, the optical film is preferably applied on the window material placed facing especially any direction from east through south to west (e.g., southeast to southwest). This is because heat-ray can be reflected more effectively by applying to the window material placed as described above. The optical body may be used for not only single windowpanes but also specialized glass such as multiple glass. Moreover, the window material is not limited to those made of glass and may be made of a polymer material having transparency. The optical layer preferably has transparency in the visible region. This is because, when the optical body is bonded to a window material such as a windowpane, the optical body transmits the visible light, result in ensuring daylighting with sunlight. The optical body may be bonded to not only an inner surface but also an outer surface of the window material.

The optical body may be used in combination with other heat-ray cutting films. For example, a light absorbing coating film may be disposed at an interface between air and the optical body (i.e., the outermost surface of the optical body). The optical body may also be used in combination with, for example, a hardcoat layer, an ultraviolet cut layer, and an anti-surface reflecting layer. When these functional layers are used in combination, these functional layers are preferably disposed at the interface between the optical body and air. However, the ultraviolet cut layer needs to be disposed on a side closer to the sun than the optical body. Therefore, especially when used for bonding to a surface of a windowpane facing an inside of the room, the ultraviolet cut layer is preferably disposed between the surface of the windowpane and the optical body. In this case, an ultraviolet absorbing agent may be kneaded into a joining layer between the surface of the windowpane and the optical body.

The optical body may be colored to thereby provide aesthetic appearance depending on applications of the optical body. In the case of providing the aesthetic appearance, the optical layer preferably absorb only the light in a certain wavelength range to the extent that transparency is not impaired.

One example of the optical body of the present invention will now be described with reference to drawings.

Figure 12:
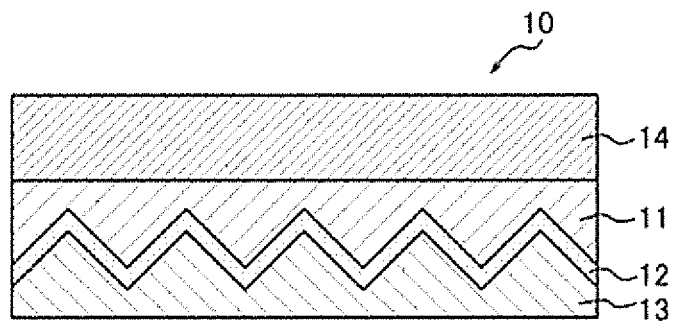
FIG. 12 is a cross-sectional view illustrating one exemplary optical body of the present invention.

FIG. 12 is a cross-sectional view illustrating one exemplary the optical body according to the first embodiment of the present invention. The optical body in FIG. 12 includes a first optical layer 11 illustrated in FIGS. 4A and 4B.

In FIG. 12, an optical body 10 includes a first optical layer 11 which has a surface having a convex profile, an inorganic layer 12 disposed on a surface of the first optical layer 11 on a side having the convex profile, a second optical layer 13 disposed so that the convex profile is embedded on a side of the inorganic layer 12, and a first base material 14 disposed on a surface of the first optical layer 11 opposite to the surface having the convex profile.

<Wavelength Selective Reflectivity>

Figure 13A:
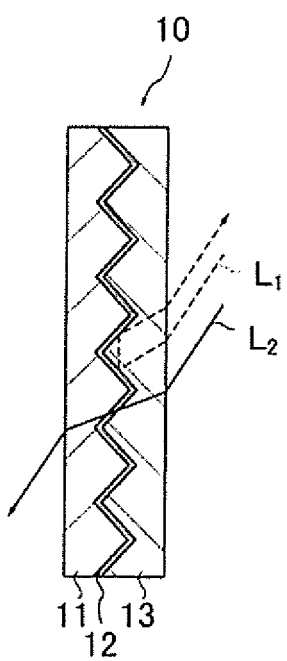
FIG. 13A is a cross-sectional view illustrating one exemplary function of an optical body of the present invention.
Figure 13B:
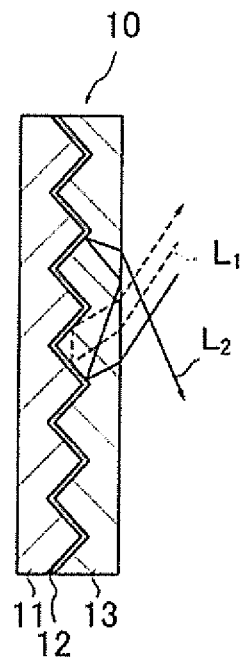
FIG. 13B is a cross-sectional view illustrating one exemplary function of an optical body of the present invention.

FIGS. 13A and 13B are cross-sectional views illustrating one exemplary function of the optical body. As one example, the case where the convex portion has a prism-like shape having an inclination angle of 45° will now be described.

As illustrated in FIG. 13A, a part of sunlight which is incident in the optical body 10 and reflected to the sky, that is, light $L_1$ is directionally reflected towards the sky in an opposite direction to an incident direction, but light $L_2$, which is not reflected to the sky, passes through the optical body 10.

As illustrated in FIG. 13A, light which is incident in the optical body 10 and reflected by a reflecting film surface of the inorganic layer 12 (wavelength selective reflecting layer) is divided into the light $L_1$ which is reflected to the sky and the light $L_2$ which is not reflected to the sky at a proportion depending on an incident angle. The light $L_2$ which is not reflected to the sky is totally reflected at an interface between the second optical layer 13 and air and then finally reflected to a difference direction from the incident direction.

A proportion x of the light $L_1$ which is reflected to the sky relative to the total reflection components may be represented as the following expression (1):

$$x=(\sin(45-\alpha')+\cos(45-\alpha')/\tan(45+\alpha'))/(\sin(45-\alpha')+\cos(45-\alpha'))\times R^2 \quad (1)$$

wherein
α denotes an incident angle of the light;
n denotes a refractive index of the second optical layer 13;
R denotes a reflectance of the wavelength selective reflecting layer; and
$\alpha'=\sin^{-1}(\sin \alpha/n)$.

The higher the proportion of the light $L_1$ which is not reflected to the sky is, the lower the proportion of the light which is reflected to the sky relative to the incident light is. In order to increase the proportion of the light which is reflection to the sky, it is effective to devise a profile of the wavelength selective reflecting layer, that is, a convex profile of the first optical layer 11.

Figure 14:
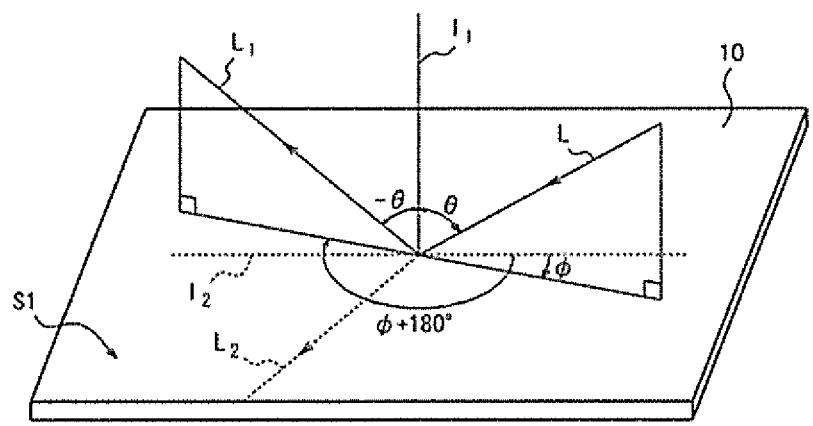
FIG. 14 is a perspective view illustrating a relationship between incident light entering an optical body having wavelength selective reflectivity and reflected light reflected by the optical body.

FIG. 14 is a perspective view illustrating a relationship between incident light which is incident in the optical body 10 having wavelength selective reflectivity and reflected light which is reflected by the optical body 10. The optical body 10 has an incident surface S1 where light L enters. Of the light L which is incident on the incident surface S1 at an incident angle (θ, φ), the optical body 10 selectively directionally reflects light $L_1$ in a certain wavelength band to a direction other than a regular reflection direction (−θ, φ+180°) but transmits light $L_2$ in wavelengths other than the certain wavelength band. Moreover, the optical body 10 has transparency to light in wavelengths other than the certain wavelength band. The transparency is preferably falls within the below-described range of transmission image clarity. Note that, θ is an angle formed between a perpendicular line $l_1$ to the incident surface S1, and the incident light L or the reflected light $L_1$ ("θ" may be hereinafter referred to as a vertical angle); and φ is an angle formed between a certain straight line $l_2$ on the incident surface Si, and a component obtained by projecting the incident light L or the reflected light $L_1$ onto the incident surface S1 ("φ" may be hereinafter referred to as an azimuth angle). Here, the certain straight line $l_2$ on the incident surface S1 is an axis at which reflection strength in the direction φ is maximized when the incident angle (θ, φ) is fixed and the optical body 10 is rotated about the perpendicular line $l_1$ to the incident surface S1 of the optical body 10. In the case where there are a plurality of axes (directions) at which the reflection strength is maximized, one of the axes is selected as the line $l_2$. Note that, an angle θ rotated clockwise from the perpendicular line $l_1$ as a reference is determined as "+θ," and an angle θ rotated anti-clockwise is determined as "−θ." An angle φ rotated clockwise from the line $l_2$ as a reference is determined as "+φ," and the angle rotated anti-clockwise is determined as "−φ."

The light in a certain wavelength band to be selectively directionally reflected and a certain light to be transmitted vary depending on applications of the optical body 10. In the case where the optical body 10 is applied for a window material serving as an external support, for example, it is preferable that the light in a certain wavelength band to be selectively directionally reflected be near infrared light and the light in a certain wavelength band to be transmitted be visible light. Specifically, the light in a certain wavelength band to be selectively directionally reflected is preferably near infrared light mainly in a wavelength band of 780 nm or greater but 2,100 nm or less. Because the near infrared light is reflected, a temperature within a building can be prevented from increasing when the optical body is bonded to a window material such as a windowpane. As a result, a cooling load can be reduced and energy saving can be achieved. The phrase "directionally reflected," as used herein, means that an intensity of light reflected to a certain direction other than regular reflection is stronger than that of light regularly reflected, and is sufficiently stronger than that of light diffusely reflected without directionality. The term "reflected," as used herein, means that reflectance in a certain wavelength band, such as a near infrared region, is preferably 30% or greater, more preferably 50% or greater, and more preferably 80% or greater. The term "transmitted," as used herein, means that transmittance in a certain wavelength band, such as a visible light region, is preferably 30% or greater, more preferably 50% or greater, and more preferably 70% or greater.

In the optical body 10 having wavelength selective reflectivity, a direction $\phi o$ in which light is directionally reflected is preferably −90° or greater but 90° or less. This is because light in a certain wavelength band out of light incident from the sky can be returned to the sky, when the optical body 10 is bonded to an external support. In the case where there are no high buildings therearound, the optical body 10 falling within the scope described above is useful. Moreover, the direction in which light is directionally reflected is preferably in the vicinity of $(\theta, -\phi)$. The phrase "in the vicinity of," as used herein, means a deviation with respect to $(\theta, -\phi)$ is preferably within 5 degrees, more preferably within 3 degrees, and even more preferably within 2 degrees. The above-described range allows light in a certain wavelength band out of light incident from the sky above one building in a region in which there are many buildings having similar heights to each other to efficiently return to the sky above the other buildings, when the optical body 10 is bonded to the external support. In order to directionally reflect the light in the above-described manner, a three-dimensional structure, such as a part of a spherical surface or a hyperboloid, a trigonal pyramid, a quadrangular pyramid, and a cone is preferably used. Light incident in a direction $(\theta, \phi)$ $(-90°<\phi<90°)$ can be reflected in a direction $(\theta o, \phi o)$ $(0°<\theta o<90°, -90°<\phi o<90°)$ in accordance with a shape of the structure. Alternatively, the three-dimensional structure preferably have an elongated object extending in one direction. Light incident in a direction $(\theta, \phi)$ $(-90°<\phi<90°)$ can be reflected in a direction $(\theta o, -\phi)$ $(0°<\theta o<90°)$ in accordance with an inclination angle of the elongated object. Therefore, when there are buildings have similar heights to each other, the light incident in the direction $(\phi, \theta)$ can be reflected to a direction $(\phi 0, -\theta)$. In the present invention, in the case of a building higher than a building where the sunlight enters or a building where light reflected by a building therearound enters, local reflection of sunlight can be reduced by combining elements of the present invention.

In the optical body 10 having wavelength selective reflectivity, it is preferable that the light in a certain wavelength band be directionally reflected in a direction in the vicinity of a retro-reflection direction, that is, for light which is incident on the incident surface S1 at an incident angle $(\theta, \phi)$, the light in a certain wavelength band be reflected in a direction in the vicinity of $(\theta, \phi)$. This is because the light in a certain wavelength band out of light incident from the sky can be returned to the sky, when the optical body 10 is bonded to the external support. The phrase "in the vicinity of," as used herein, refers to preferably within 5 degrees, more preferably within 3 degrees, and even more preferably within 2 degrees. This range allows the light in a certain wavelength band out of light incident from the sky to efficiently return to the sky, when the optical body 10 is bonded to the external support. Therefore, when there are buildings have similar heights to each other, the light can be efficiently reflected by reflecting the light incident in the direction $(\phi, \theta)$ to the direction $(\phi 0, -\theta)$. In the present invention, in the case of a building higher than a building where the sunlight enters or a building where light reflected by a building therearound enters, local reflection of sunlight can be reduced by combining elements of the present invention. In the case of, for example, an infrared sensor or an infrared imaging device where an infrared light irradiation portion and a light receiving portion are adjacent to each other, a retroreflection direction needs to be identical to an incident direction. However, the retroreflection direction does not need to be strictly identical to the incident direction when it is not necessary to perform sensing in a certain direction.

<Transmission Image Clarity>

A value of transmission image clarity of the optical body to light in a wavelength band to which the optical body has transparency as determined using an optical comb of 2.0 mm is not particularly limited and may be appropriately selected depending on the intended purpose. The value is preferably 60% or greater, and more preferably 75% or greater.

Moreover, value of transmission image clarity of the optical body to light in a wavelength band to which the optical body has transparency as determined using an optical comb of 0.5 mm is not particularly limited and may be appropriately selected depending on the intended purpose. The value is preferably 60% or greater, and more preferably 75% or greater. When the value of the transmission image clarity is 60% or greater but less than 75%, the outdoor sight can be clearly viewed although only a very bright object, such as a light source, causes a displeasing diffraction pattern. When the value of the transmission image clarity is 75% or greater, a diffraction pattern hardly disturbs a view.

The value of the transmission image clarity is measured by means of ICM-1T available from Suga Test Instruments Co., Ltd. according to JIS K-7374:2007. In the case where the wavelength to be transmitted is different from that of the D65 light source, measurement is preferably performed after calibrating using a filter for the wavelength to be transmitted.

<Method for Producing Optical Body>

One example of a method for producing the optical body according to one embodiment of the present invention will now be described with reference to FIGS. 15A to 15C, 16A to 16C, and 17A to 17D. Note that, a part of or the whole of a production process described below is preferably performed in a roll-to-roll manner form the viewpoint of productivity, except for a step of producing a mold.

A production example described below is a production example of the optical body including the first optical layer 11 illustrated in FIGS. 4A and 4B.

Figure 15A:
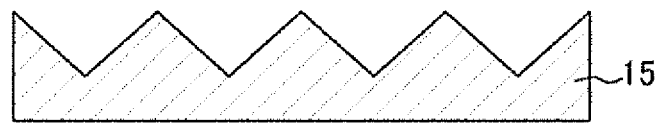
FIG. 15A is a process drawing for describing one exemplary production method of an optical body according to one embodiment of the present invention (part 1).
Figure 15B:
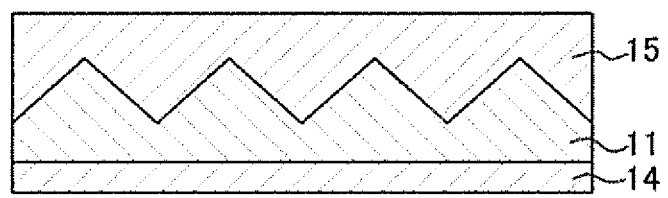
FIG. 15B is a process drawing for describing one exemplary production method of an optical body according to one embodiment of the present invention (part 2).

As illustrated in FIG. 15A, first, a master material 15 having a convex profile identical to that of the first optical layer 11 or a mold (replica) having a profile reversed to that of the master material 15 is formed, for example, by bite machining or laser machining. A method for producing the master material 15 is as described with reference to FIGS. 4C and 4D. Next, as illustrated in FIG. 15B, the convex profile of the master material 15 is transferred to a resin material in the form of a film, for example, by a melt extrusion process or a transfer process. Examples of the transfer process include a method in which a photocurable resin composition is poured into a mold and irradiated with energy-rays to thereby cure the photocurable resin composition; a method in which heat or pressure is applied to a resin to thereby transfer the profile; and a method (laminate transfer process) in which a resin film is supplied from a roll and a profile of a mold is transferred to the film with applying heat. Thus, the first optical layer 11 having a convex profile on a main surface thereof is formed as illustrated in FIG. 15C.

Figure 15C:
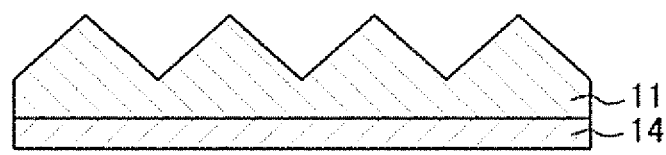
FIG. 15C is a process drawing for describing one exemplary production method of an optical body according to one embodiment of the present invention (part 3).

As illustrated in FIG. 15C, the first optical layer 11 may be formed on the first base material 14. In this case, for example, a method described below may be used. The first base material 14 in the form of film is supplied from a roll. A photocurable resin composition is applied onto the first base material 14 and then pressed against a mold to thereby transfer a profile of the mold. Then, energy-rays, such as ultraviolet rays, are applied to cure the photocurable resin composition.

Figure 16A:
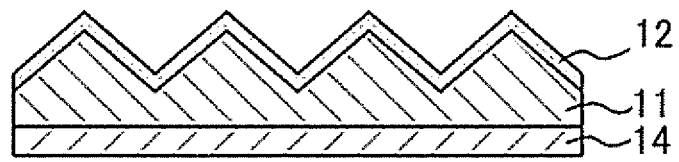
FIG. 16A is a process drawing for describing one exemplary production method of an optical body according to one embodiment of the present invention (part 4).
Figure 16B:
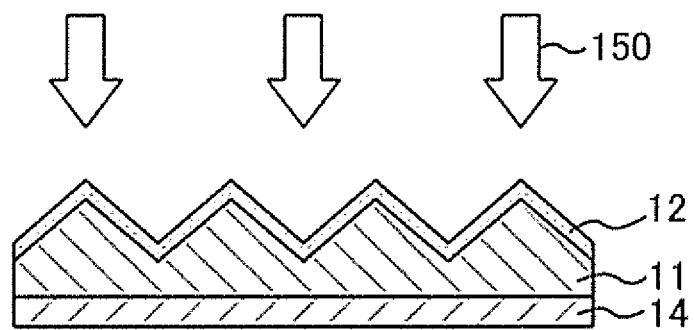
FIG. 16B is a process drawing for describing one exemplary production method of an optical body according to one embodiment of the present invention (part 5).

Next, as illustrated in FIG. 16A, a wavelength selective reflecting layer (functional layer) serving as an inorganic layer 12 is formed on a main surface of the first optical layer 11. A method for forming the wavelength selective reflecting layer serving as the inorganic layer 12 is not particularly limited and may be appropriately selected depending on the intended purpose. Examples thereof include a sputtering method, a vapor deposition method, a chemical vapor deposition (CVD) method, a dip coating method, a die coating method, a wet coating method, and a spray coating method. The layer is preferably formed using one appropriately selected from the above-listed methods in accordance with a profile of the convex profile. Subsequently, as illustrated in FIG. 16B, the wavelength selective reflecting layer serving as the inorganic layer 12 is subjected to an annealing treatment 150. For example, a temperature in the annealing treatment falls within a range of 100° C. or higher but 250° C. or lower.

Figure 16C:
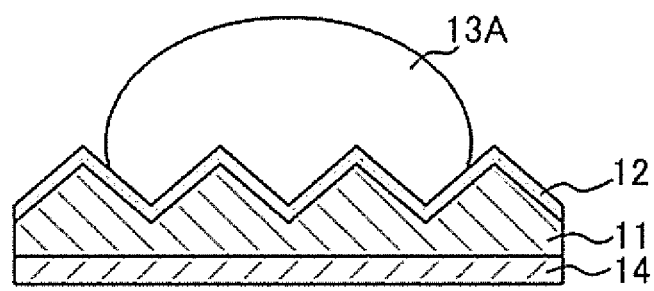
FIG. 16C is a process drawing for describing one exemplary production method of an optical body according to one embodiment of the present invention (part 6).

Next, a photocurable resin composition 13A is applied onto the wavelength selective reflecting layer serving as the inorganic layer 12, as illustrated in FIG. 16C.

Figure 17A:
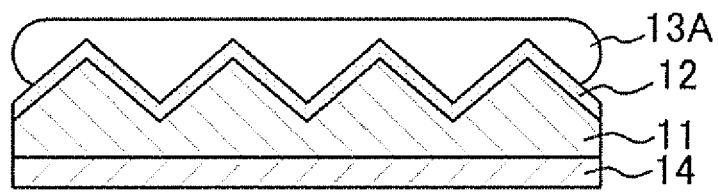
FIG. 17A is a process drawing for describing one exemplary production method of an optical body according to one embodiment of the present invention (part 7).

As illustrated in FIG. 17A, subsequently, the photocurable resin composition 13A is spread to a predetermined thickness by, for example, a coater to fill the convex profile to thereby form a laminate.

Figure 17B:
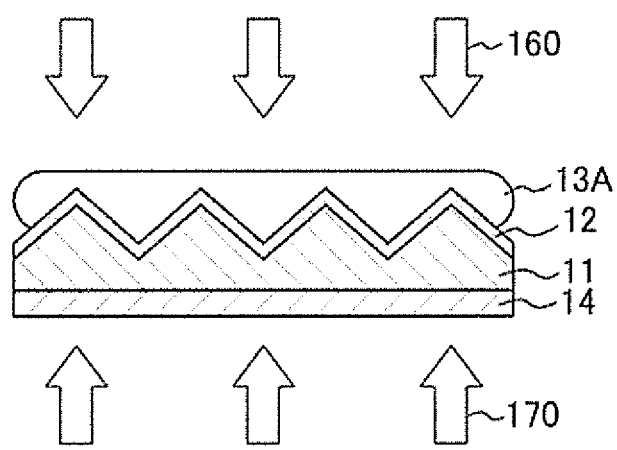
FIG. 17B is a process drawing for describing one exemplary production method of an optical body according to one embodiment of the present invention (part 8).

Next, the photocurable resin composition 13A is cured, for example, with energy-rays 160 and pressure 170 is applied to the laminate, as illustrated in FIG. 17B. The energy-rays are not particularly limited and may be appropriately selected depending on the intended purpose. Examples thereof include electron beams, ultraviolet rays, visible light rays, gamma rays, and electron beams. Among them, ultraviolet rays are preferable from the viewpoint of production equipment. A cumulative irradiation dose is not particularly limited and may be appropriately selected considering, for example, a curing property of a resin and prevention of yellowing of the resin or the first base material 14. The pressure to be applied to the laminate is not particularly limited and may be appropriately selected depending on the intended purpose. The pressure is preferably 0.01 MPa or greater but 1 MPa or less. When the pressure of less than 0.01 MPa is applied to the laminate, a problem may occur in travelling of the film. When the pressure of greater than 1 MPa is applied to the laminate, on the other hand, a metal roller needs to be used as a nip roll, and pressure unevenness tends to occur.

Figure 17C:
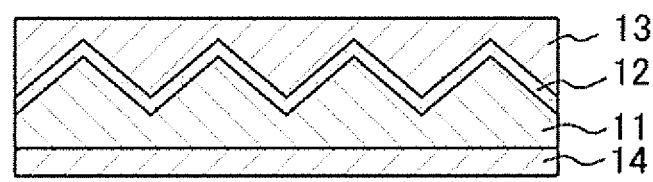
FIG. 17C is a process drawing for describing one exemplary production method of an optical body according to one embodiment of the present invention (part 9).

As described above, the second optical layer 13 is formed on the wavelength selective reflecting layer serving as the inorganic layer 12 to thereby obtain the optical body 10, as illustrated in FIG. 17C.

Moreover, the optical body of the present invention may include a second base material disposed on the second optical layer 13 on a side opposite to the side on which the inorganic layer 12 is disposed.

A flatness of a surface of the second optical layer 13 on a side opposite to the side on which the inorganic layer 12 is disposed is attributed to, for example, a flatness of a coater head and a thickness of a resin (the degree of filling of a convex-concave profile).

EXAMPLES

The present invention will now be specifically described through Examples and Comparative Examples, but the present invention is not limited to Examples below.

Example 1

An effect of directivity of upward reflection when a convex profile of an optical body was changed was verified by simulation.

In Example 1, an optical body in which a height of a triangular cross section of a convex portion continuously varies [optical body meeting the (1)] was evaluated.

The convex portion had the following characteristics.

Average pitch (distance between valley portions of structural bodies adjacent to each other): 67 μm Average height (AH): 31 μm Amplitude in height (A): 5 μm Type of amplitude: sine wave Period of sine wave (Pe): 800 μm Maximum inclination angle (E) of ridges in extending direction: 1.1 deg Deviation from an adjacent structural body (Phase) (ΔPh): ½ period Simulation using a ray-tracing algorithm was performed for verifying an effect of a shape of a reflection surface on reflection.

The sufficient number of light beams were emitted as quasi-collimated beams from a light source towards a reflection surface by Monte Carlo method (a reflector has a structure in which the reflection surface is embedded with a resin in a similar manner as a real reflector).

In the simulation, upward reflectance of near infrared radiation at a vertical angle (θ) from 20 deg from a normal direction to a surface of a measurement sample was calculated. An azimuth angle (ϕ) of incident light to a sample was defined as ϕ=0 deg.

For the evaluation of reflected light, intensities of light beams every 1 deg of each of the vertical angle and the azimuth angle were calculated in a similar manner as in Mini Diff used for an actual measurement described below and compared as follows.

<Upward Reflection>

Upper reflected components reflected above the horizontal line including the normal line in a light incident direction surface in a test model were counted from a distribution of reflection intensities resulted from the simulation using the ray-tracing algorithm. A relative value % when considering the result of numerical values of the upward reflective components in triangular prisms of Comparative Example 1 described below as 100% was calculated as a relative value of the upward reflection.

Based on the relative value of the upward reflection, an extent that an upward reflection performance is not impaired was evaluated.

<Local Reflection>

A numerical value of the highest intensity except for specular reflection (peak reflective intensity) was read from a distribution of reflection intensities resulted from the simulation using the ray-tracing algorithm. A relative value % when considering the result of the numerical value of the highest intensity except for specular reflection (peak reflective intensity) in triangular prisms of Comparative Example 1 described below as 100% was calculated as a ratio of local reflection intensities.

The relative value of the numerical value of the highest intensity except for specular reflection was used to evaluate an inhibitory effect on the local reflection.

The convex profile of Example 1 is presented in Table 1-1. Evaluation results of Example 1 are presented in Table 1-2.

A state of the local reflection was evaluated according to the following evaluation criteria.

[Evaluation Criteria]

A: Light obliquely incident on a surface of an optical body was reflected linearly from a reflection portion and bright spots were locally located.

B: Light obliquely incident on a surface of an optical body was reflected non-linearly from a reflection portion and bright spots were less locally located because the bright spots were belt-like or divided into a plurality.

Examples 2 to 13 and Comparative Examples 1 and 2

Evaluation was performed in the same manner as in Example 1, except that the convex profile was changed as described in Table 1-1. The results are presented in Table 1-2. Note that, in the convex profile of Example 13, the triangular prism-shaped convex portion and the elongated convex portion having a curved surface are adjacent to each other, as illustrated in FIG. 9A.

TABLE 1-1

| | Reflection structural body | | | | | | | |
|---|---|---|---|---|---|---|---|---|
| | Type — | Average pitch μm | Average height μm | Amplitude in height μm | Type of amplitude — | Period μm | Maximum angular variation of ridge in extending direction or direction in-plane rotated by 90° from extending direction deg | Amplitude/ 1 period % | Deviation from adjacent structural body (Phase deviation) — |
| Ex. 1 | Height of triangular cross section varies in extending direction (amplitude in normal line direction) | 67 | 31 | 5 | Sine wave | 800 | 1.1 | 0.6% | ½ period |
| Ex. 2 | | | | 10 | | | 2.3 | 1.3% | |
| Ex. 3 | | | | 15 | | | 3.4 | 1.9% | |
| Ex. 4 | | | | 20 | | | 4.5 | 2.5% | |
| Ex. 5 | | | | 30 | | | 6.7 | 3.8% | |
| Ex. 6 | | | | 40 | | | 8.9 | 5.0% | |
| Ex. 7 | Height of triangular cross section varies in extending direction (amplitude in normal line direction) | | | 10 | | | 2.3 | 1.3% | None |
| Ex. 8 | Height of triangular cross section meanderingly varies in direction rotated by 90° from extending direction (in-plane meandering (same phase as adjacent one) | | | 5 | | | 1.1 | 0.6% | ½ period |
| Ex. 9 | | | | 10 | | | 2.3 | 1.3% | |
| Ex. 10 | | | | 20 | | | 4.5 | 2.5% | |
| Ex. 11 | | | | 30 | | | 6.7 | 3.8% | |
| Ex. 12 | | | | 40 | | | 8.9 | 5.0% | |
| Ex. 13 | Triangular prisms and semicylinders | | | None | None | — | — | — | — |
| Comp. Ex. 1 | Triangular prisms are aligned in direction rotated by 90° from extending direction | | 31 | None | None | — | — | — | — |
| Comp. Ex. 2 | Semicylinders | | | None | None | — | — | — | — |

TABLE 1-2

| | Upward reflection | | | | | | |
|---|---|---|---|---|---|---|---|
| | Azimuth angle φ deg | Vertical angle θ deg | Upward reflection Ratio of components % | Relative reference — | Upward reflection directivity Ratio of local reflection intensities % | Relative reference — | State of local reflection |
| Ex. 1 | 0 | 20 | 100% | Comp. Ex. 1 | 38% | Comp. Ex. 1 | B |
| Ex. 2 | | | 100% | | 24% | | B |
| Ex. 3 | | | 100% | | 19% | | B |
| Ex. 4 | | | 99% | | 18% | | B |
| Ex. 5 | | | 97% | | 15% | | B |
| Ex. 6 | | | 95% | | 15% | | B |
| Ex. 7 | | | 100% | | 30% | | B |

TABLE 1-2-continued

| | Azimuth angle φ deg | Vertical angle θ deg | Upward reflection | | Upward reflection directivity | | |
|---|---|---|---|---|---|---|---|
| | | | | | Ratio of local | | |
| | | | Ratio of components % | Relative reference — | reflection intensities % | Relative reference — | State of local reflection |
| Ex. 8 | | | 100% | | 92% | | B |
| Ex. 9 | | | 100% | | 73% | | B |
| Ex. 10 | | | 98% | | 45% | | B |
| Ex. 11 | | | 100% | | 37% | | B |
| Ex. 12 | | | 100% | | 31% | | B |
| Ex. 13 | | | 80% | | 58% | | B |
| Comp. Ex. 1 | | | 100% | — | 100% | — | A |
| Comp. Ex. 2 | | | 43% | Comp. Ex. 1 | 16% | Comp. Ex. 1 | B |

The results above were summarized in graphs and presented in FIGS. 20 to 25.

Figure 20:
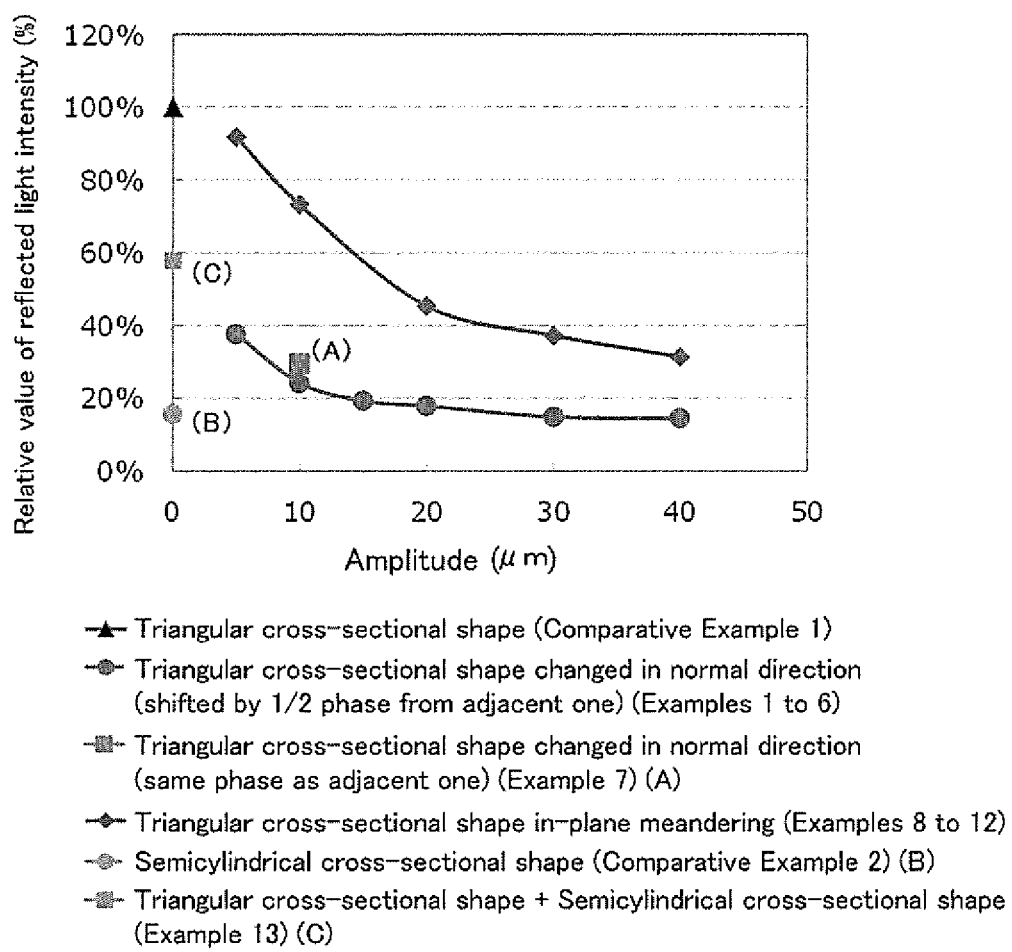
FIG. 20 is a graph illustrating a relationship between amplitudes and relative values of reflected light intensities.

FIG. 20 is a graph illustrating a relationship between amplitudes and relative values of reflected light intensities (ratio of local reflection intensities).

Figure 21:
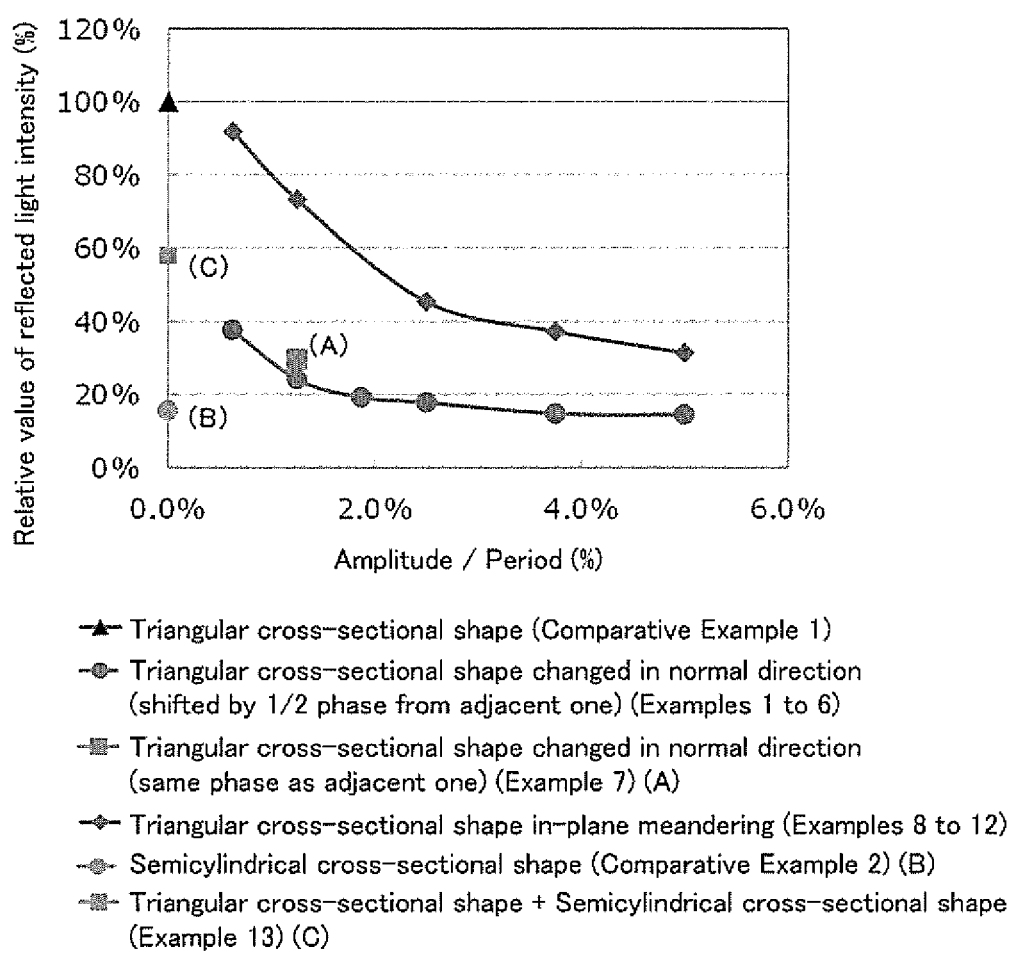
FIG. 21 is a graph illustrating a relationship between amplitudes/periods and relative values of reflected light intensities.

FIG. 21 is a graph illustrating a relationship between amplitudes/periods and relative values of reflected light intensities (ratio of local reflection intensities).

Figure 22:
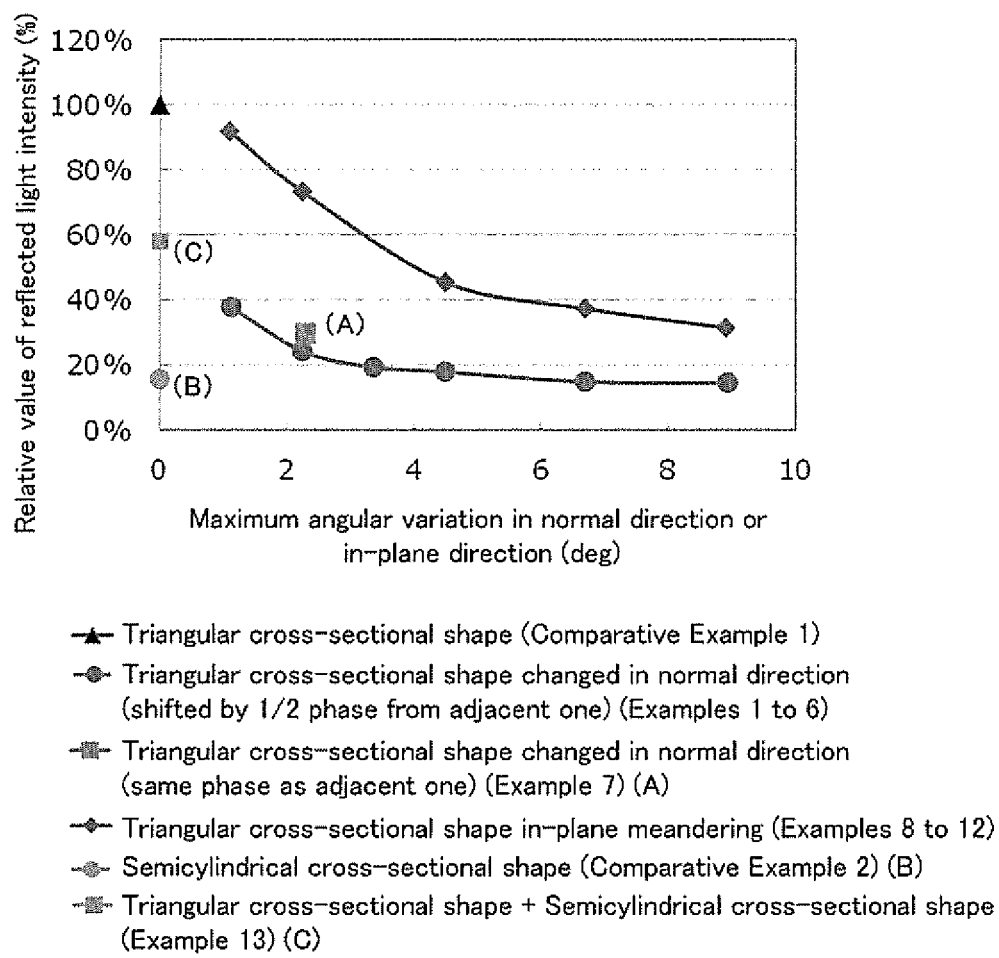
FIG. 22 is a graph illustrating a relationship between maximum angular variation and relative values of reflected light intensities.

FIG. 22 is a graph illustrating a relationship between maximum angular variation and relative values of reflected light intensities (ratio of local reflection intensities).

Figure 23:
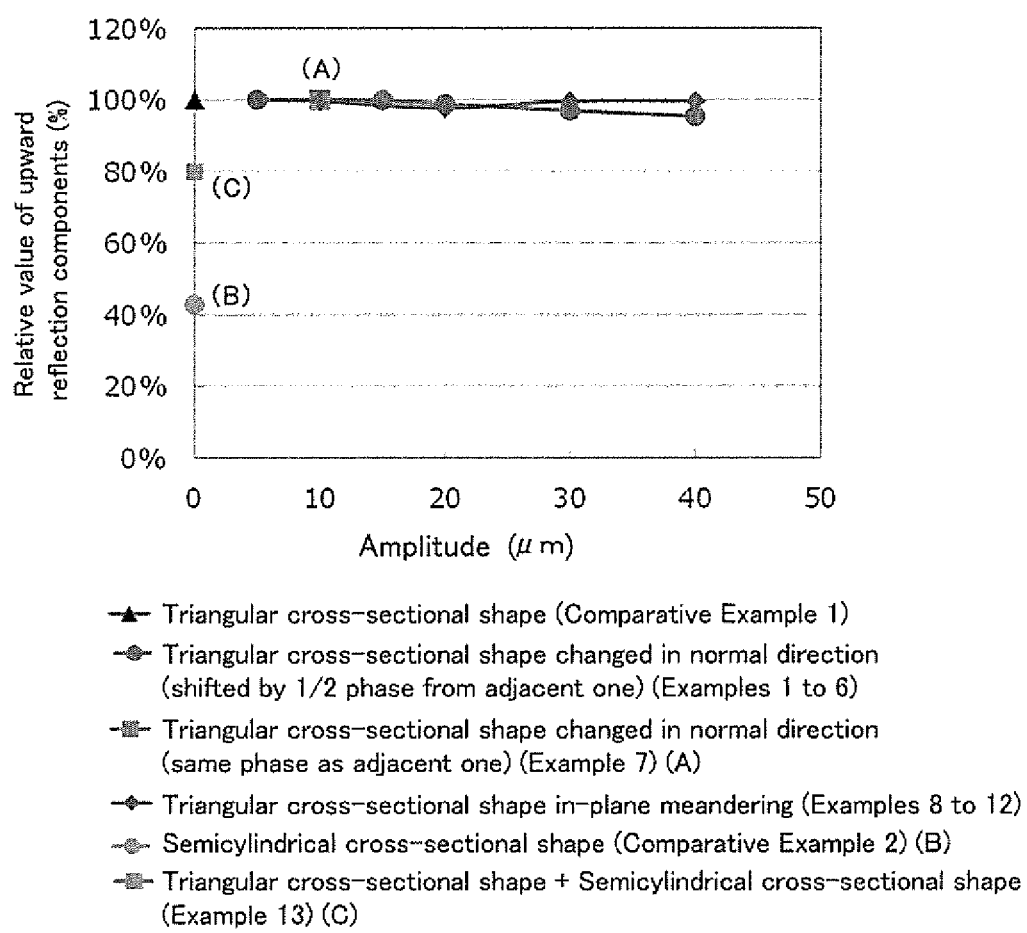
FIG. 23 is a graph illustrating a relationship between amplitudes and relative values of upward reflection components.

FIG. 23 is a graph illustrating a relationship between amplitudes and relative values of upward reflection components.

Figure 24:
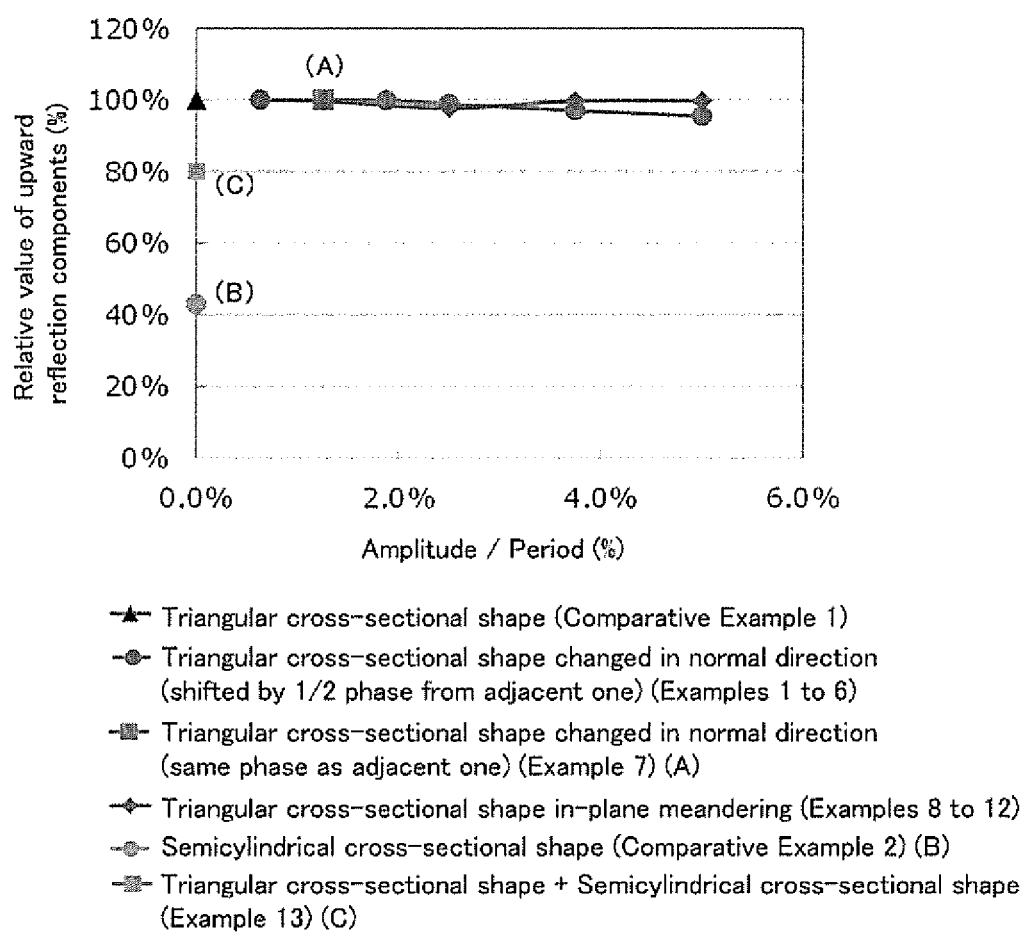
FIG. 24 is a graph illustrating a relationship between amplitudes/periods and relative values of upward reflection components.

FIG. 24 is a graph illustrating a relationship between amplitudes/periods and relative values of upward reflection components.

Figure 25:
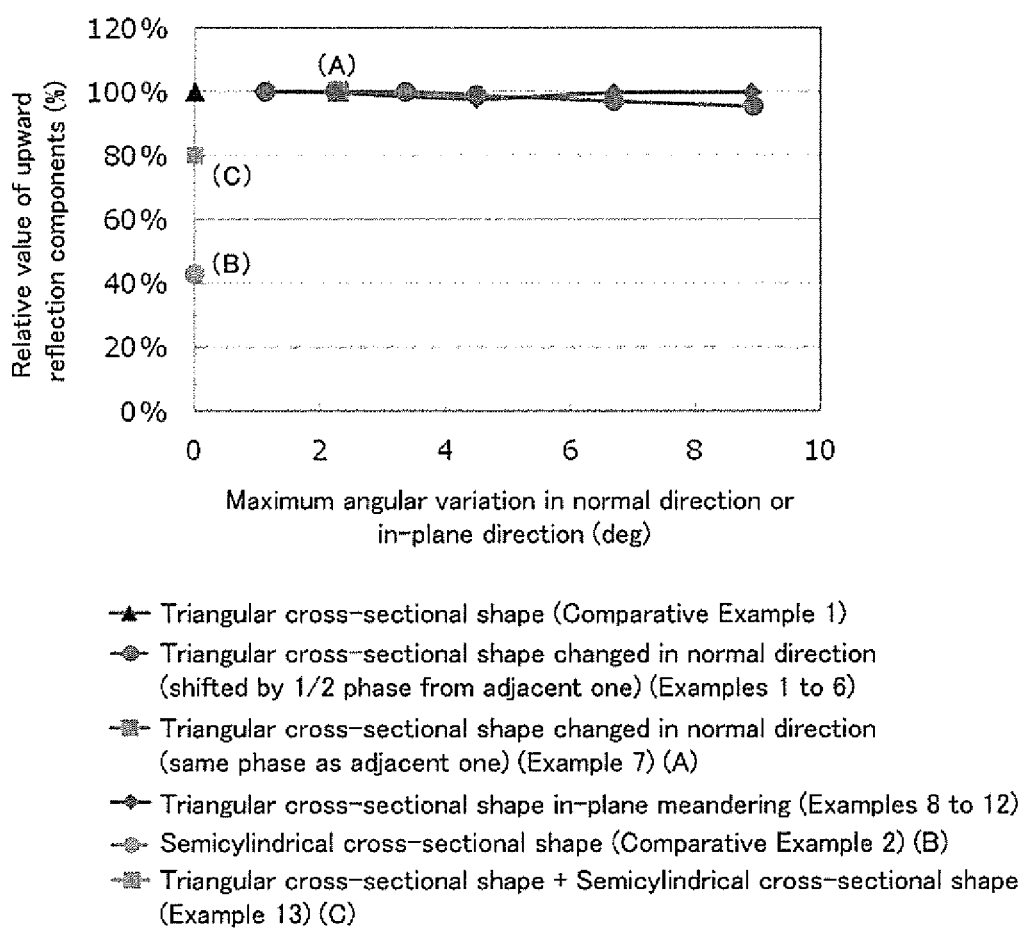
FIG. 25 is a graph illustrating a relationship between maximum angular variation and relative values of upward reflection components.

FIG. 25 is a graph illustrating a relationship between maximum angular variation and relative values of upward reflection components.

It was confirmed from FIGS. 20 to 22 that a height having amplitude change [corresponding to the aspect of (1)], in-plane meandering [corresponding to the aspect of (2)], and a combination of triangular prisms and curved surfaces [corresponding to the aspect of (4)] had a higher inhibitory effect on local reflection than the triangular prism of Comparative Example 1.

It was also confirmed that especially the height having amplitude change [corresponding to the aspect of (1)] had a higher inhibitory effect on local reflection than the in-plane meandering [corresponding to the aspect of (2)] and the combination of triangular prisms and curved surfaces [corresponding to the aspect of (4)].

It was confirmed from FIGS. 23 to 25 that Comparative Example 2 having only curved surfaces had low upward reflection, but local reflection was able to be inhibited while keeping upward reflection by combining triangular prisms with curved surfaces as in Example 13. It is believed that this is because multiple reflection needed to direct light upward does not occur on the curved surface in Comparative Example 2.

Example 14-1

<Production of Optical Body>

In order to produce structural bodies each having a continuously varying height in a direction in which a triangular cross section extends as illustrated in FIG. 5A, a master material was processed so as to have a height varying in a direction in which a triangular prism-shaped structural body extends as illustrated in FIG. 5D. The optical body to be produced was the optical body meeting the (1).

Process Specification of Master Material

Average profile gap (distance between valley portions of structural bodies adjacent to each other): 67 μm Average profile height (AH): 31 μm Base angle of cross section-D1: 35 deg Base angle of cross section-D2: 55 deg Height amplitude in extending direction (A): 10.5 μm Height modulation in extending direction: sine wave Period of sine wave (Pe): 800 μm Deviation from structural body adjacent thereto (phase) (ΔPh): ½ period (Processing in which Structural Bodies Adjacent to Each Other have Heights Modulated in a Phase Corresponding to a ½ Period so that a Structural Body Adjacent to a Structural Body Having the Highest Height has the Lowest Height)

The thus-processed master material was used to form a first optical layer on which structural bodies each having a continuously varying height in a direction in which a triangular cross section extends are provided as illustrated in FIG. 5A by transferring a photo-curing resin composition (post-cured refractive index: 1.52) on a PET base material (available from Toray Industries, Inc., thickness: 75 μm) and irradiating the photo-curing resin composition with ultraviolet-rays to thereby cure. A post-cured thickness was 110 μm.

An inorganic layer having the following configuration for reflecting near infrared radiation was formed on the thus-formed first optical layer by means of a vacuum sputtering method. The photo-curing resin composition (post-cured refractive index: 1.52) was applied onto the thus-formed inorganic layer and the PET base material (available from Toray Industries, Inc., thickness: 75 μm) was irradiated with ultraviolet-rays to thereby cure the photo-curing resin composition. Thus, a second optical layer was formed. Thus, the optical body was produced. The resultant optical body had a post-cured thickness of 205 μm.

The resultant optical body was subjected to the following test and measurement. The results are presented in Table 2-2.

<<Configuration of Inorganic Layer>>

(First optical layer)/$Nb_2O_5$ (36 nm)/AgPdCu (11 nm)/$Al_2O_3$—ZnO (4 nm)/$Nb_2O_5$ (80 nm)/AgPdCu (11 nm)/$Al_2O_3$—ZnO (4 nm)/$Nb_2O_5$ (36 nm)/$Al_2O_3$—ZnO (4 nm)/(Second optical layer).

For formation of the AgPdCu film, an alloy target having a composition of Ag/Pd/Cu=98.1% by mass/0.9% by mass/1.0% by mass was used.

For formation of the $Al_2O_3$—ZnO film, a ceramic target in which 2% by mass of $Al_2O_3$ was added to ZnO [ZnO:$Al_2O_3$=100:2 (mass ratio)] was used. For formation of the $Nb_2O_5$ film, $Nb_2O_5$ was used. Thickness of each of layer is represented as a thickness when a film is formed on a flat surface having no profile.

<Visible Light Transmittance, Visible Light Reflectance, Shading Coefficient>

A test was performed according to JIS A 5759. Specifically, the optical body was bonded to a sheet of float glass having a thickness of 3 mm using a commercially available highly transparent adhesive material and measured by a spectrophotometer (UH4150, available from Hitachi High-Tech Science Corporation).

Based on the resultant values of spectral transmittance and reflectance, a visible light transmittance, a visible light reflectance, and a shading coefficient were calculated according to JIS A5759.

Figure 26:
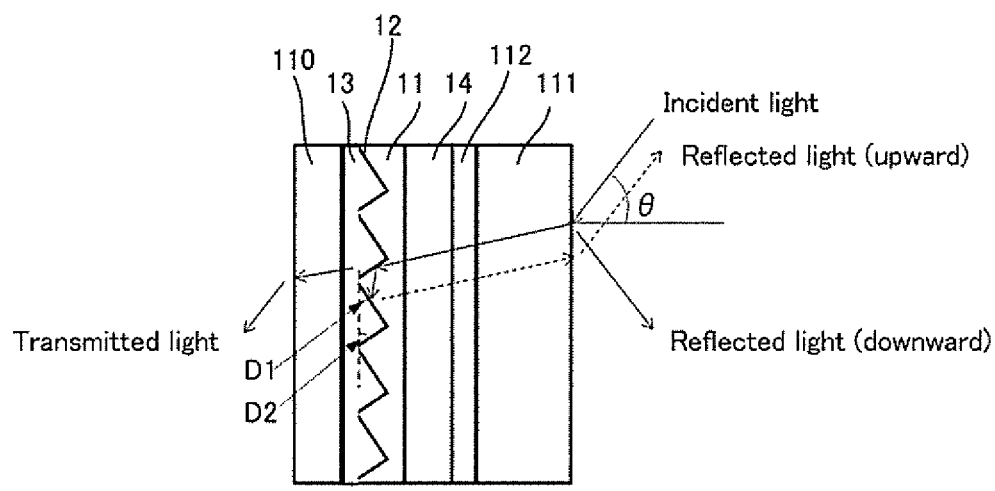
FIG. 26 is a diagram illustrating a state in which an optical body is bonded to a sheet of float glass using an adhesive material.

Note that, FIG. 26 is a diagram illustrating a state in which the optical body is bonded to the sheet of float glass using the adhesive material. In FIG. 26, a reference numeral 110 denotes a second base material, a reference numeral 111 denotes a sheet of float glass, a reference numeral 112 denotes an adhesive material, a reference code D1 denotes a base angle of a cross section-D1, and a reference code D2 denotes a base angle of a cross section-D2.

<Haze Value>

The above-described sample was subjected to a test according to JIS K7136. Specifically, the optical body was bonded to a sheet of float glass having a thickness of 3 mm using a commercially available transparent adhesive material and subjected to a measurement by means of a haze meter (NDH7000, available from NIPPON DENSHOKU INDUSTRIES CO., LTD.).

<Upper Reflectance of Near Infrared Radiation>

The sample which had been used for the optical measurement was used to measure an upward reflectance of near infrared radiation at a vertical angle (θ) which is an angle of 60 deg from a normal direction relative to a surface of the measurement sample according to 4.4 Directional reflection performance (http://www.env.go.jp/policy/etv/pdf/list/h27/051-1506a.pdf) described in Environmental Technology Verification Program 2015 by Ministry of Environment Verification No. 051-1506. An azimuth angle (φ) of incident light relative to the sample is a direction in which an upward reflectance performance of the sample is exerted in the most efficient manner (regarding vertical angle (θ), for example, see FIG. 26).

The resultant value of spectral reflectance was multiplied by a weight coefficient according to JIS A5759 to thereby calculate upward reflection components in a near infrared radiation region (780 nm to 2,500 nm) as an upward reflectance.

<Upward Reflection Directivity>

Reflection directivity was measured by means of MiniDiff (available from Light Tec) to thereby evaluate an inhibitory effect on local reflection.

The MiniDiff (available from Light Tec) is an evaluator for a visible light source and thus is difficult to measure a distribution of infrared radiation reflection. Therefore, an inorganic layer for reflecting near infrared radiation of Example 14-1 was changed to an Ag film having a thickness of 30 nm. Moreover, the size of the sheet of float glass having a thickness of 3 mm used for the above-described optical measurement was changed ton 10 cm×10 cm. A sample was produced in otherwise the same way as described above and used for the measurement.

This allows a distribution of reflection to be measured using visible light and reflection directivity to be evaluated.

In the measurement, upward reflectance of near infrared radiation at a vertical angle (θ) from 20 deg from a normal direction to a surface of the measurement sample was calculated. An azimuth angle (φ) of incident light relative to the sample is a direction in which an upward reflectance performance of the sample is exerted in the most efficient manner. That is, a direction rotated by 90 deg from a ridgeline direction of the triangular prism in the first optical layer was defined as φ=0 deg, and a direction further rotated by 15 deg was defined as φ=15 deg.

A numerical value of the highest intensity except for specular reflection (peak reflective intensity) was read from a distribution of reflection intensities. A relative value % when considering the result of the numerical value of the highest intensity except for specular reflection (peak reflective intensity) in triangular prisms of Comparative Example 3-1 described below as 100% was calculated as a ratio of local reflection intensities.

The relative value of the numerical value of the highest intensity except for specular reflection was used to evaluate an inhibitory effect on the local reflection.

<State of Local Reflection>

A state of a distribution of reflection light resulted from measurement of the reflection directivity by means of MiniDiff (available from Light Tec) was evaluated according to the following evaluation criteria.

[Evaluation Criteria]

A: Light obliquely incident on a surface of an optical body was reflected linearly from a reflection portion and bright spots were locally located.

B: Light obliquely incident on a surface of an optical body was reflected non-linearly from a reflection portion and bright spots were less locally located because the bright spots were belt-like or divided into a plurality.

<Evaluation of Appearance of Bright Line>

The optical body was bonded to a sheet of float glass having a size of □ 15 cm×15 cm and a thickness of 3 mm using an adhesive material. The optical body was irradiated with a compact light source located 15 cm above the optical body and then observed for appearance.

Visibility of bright lines was evaluated according to the following evaluation criteria.

[Evaluation Criteria]

A: A bright and clear bright line was observed from a bright spot of the light source to an end of the sheet of float glass.

B: A bright line was become very fainter and difficult to visually recognize from a bright spot of the light source towards an end of the sheet of float glass.

Examples 14-2 to 14-15

Evaluation was performed in the same manner as in Example 14-1, except that the vertical angles (θ) and the azimuth angles (φ) in the evaluation of local reflection were as described in Table 2-2. The results are presented in Table 2-2.

Example 15-1

An optical body was produced and evaluated in the same manner as in Example 14-1, except that the process specification of master material was changed as described below. The results are presented in Table 2-2.
Process Specification of Master Material
Average profile gap (distance between valley portions of structural bodies adjacent to each other): 67 μm
  Average profile height (AH): 31 μm
  Base angle of cross section-D1: 35 deg
  Base angle of cross section-D2: 55 deg
  Height amplitude in extending direction (A): 21 μm
  Height modulation in extending direction: sine wave
  Period of sine wave (Pe): 800 μm
  Deviation from structural body adjacent thereto (phase) (ΔPh): ½ period
  (Processing in which Structural Bodies Adjacent to Each Other have Heights Modulated in a Phase Corresponding to a ½ Period so that a Structural Body Adjacent to a Structural Body Having the Highest Height has the Lowest Height)

Examples 15-2 to 15-15

Evaluation was performed in the same manner as in Example 14-1, except that the vertical angles (θ) and the azimuth angles (φ) in the evaluation of local reflection were as described in Table 2-2. The results are presented in Table 2-2.

Comparative Example 3-1

An optical body was produced and evaluated in the same manner as in Example 14-1, except that the process specification of master material was changed as described below and the master material was processed so that structural bodies in which triangular cross sections extend were aligned as illustrated in FIG. 3D. Process specification of master material
  Profile gap (distance between valley portions of structural bodies adjacent to each other): 67 μm
  Profile height: 31 μm
  Base angle of cross section-D1: 35 deg
  Base angle of cross section-D2: 55 deg Comparative Examples 3-2 to 3-15

Evaluation was performed in the same manner as in Example 14-1, except that the vertical angles (θ) and the azimuth angles (φ) in the evaluation of local reflection were as described in Table 2-2. The results are presented in Table 2-2.

TABLE 2-1

| | Reflection structural body | | | | | | |
|---|---|---|---|---|---|---|---|
| | Type | Average pitch μm | Average height μm | Amplitude in height μm | Type of amplitude | Repeatedly changed cycle μm | Maximum inclination angle of ridge in extending direction deg | Deviation from adjacent structural body (Pase deviation) |
| Ex. 14-1 | Height of triangular cross section continuously varies in extending direction | 67 | 31 | 10.5 | Sine wave | 800 | 2.25 | ½ period |
| Ex. 14-2 | | | | | | | | |
| Ex. 14-3 | | | | | | | | |
| Ex. 14-4 | | | | | | | | |
| Ex. 14-5 | | | | | | | | |
| Ex. 14-6 | | | | | | | | |
| Ex. 14-7 | | | | | | | | |
| Ex. 14-8 | | | | | | | | |
| Ex. 14-9 | | | | | | | | |
| Ex. 14-10 | | | | | | | | |
| Ex. 14-11 | | | | | | | | |
| Ex. 14-12 | | | | | | | | |
| Ex. 14-13 | | | | | | | | |
| Ex. 14-14 | | | | | | | | |
| Ex. 14-15 | | | | | | | | |
| Ex. 15-1 | Height of triangular cross section continuously varies in extending direction | 67 | 31 | 21 | Sine wave | 800 | 4.5 | ½ period |
| Ex. 15-2 | | | | | | | | |
| Ex. 15-3 | | | | | | | | |
| Ex. 15-4 | | | | | | | | |
| Ex. 15-5 | | | | | | | | |
| Ex. 15-6 | | | | | | | | |
| Ex. 15-7 | | | | | | | | |
| Ex. 15-8 | | | | | | | | |
| Ex. 15-9 | | | | | | | | |
| Ex. 15-10 | | | | | | | | |
| Ex. 15-11 | | | | | | | | |
| Ex. 15-12 | | | | | | | | |
| Ex. 15-13 | | | | | | | | |
| Ex. 15-14 | | | | | | | | |
| Ex. 15-15 | | | | | | | | |

TABLE 2-1-continued

| | Reflection structural body | | | | | | |
|---|---|---|---|---|---|---|---|
| | Type — | Average pitch μm | Average height μm | Amplitude in height μm | Type of amplitude — | Repeatedly changed cycle μm | Maximum inclination angle of ridge in extending direction deg | Deviation from adjacent structural body (Pase deviation) — |
| Comp. Ex. 3-1 | Triangular prisms are aligned in direction rotated by 90° from extending direction | 67 | 31 | 0 | — | — | — | — |
| Comp. Ex. 3-2 | | | | | | | | |
| Comp. Ex. 3-3 | | | | | | | | |
| Comp. Ex. 3-4 | | | | | | | | |
| Comp. Ex. 3-5 | | | | | | | | |
| Comp. Ex. 3-6 | | | | | | | | |
| Comp. Ex. 3-7 | | | | | | | | |
| Comp. Ex. 3-8 | | | | | | | | |
| Comp. Ex. 3-9 | | | | | | | | |
| Comp. Ex. 3-10 | | | | | | | | |
| Comp. Ex. 3-11 | | | | | | | | |
| Comp. Ex. 3-12 | | | | | | | | |
| Comp. Ex. 3-13 | | | | | | | | |
| Comp. Ex. 3-14 | | | | | | | | |
| Comp. Ex. 3-15 | | | | | | | | |

TABLE 2-2

| | Optical property | | | Sunlight property Shading coefficient | Upward reflectance of near infrared radiation % | Upward reflection directivity | | | | | |
|---|---|---|---|---|---|---|---|---|---|---|---|
| | Visible light transmittance % | Visible light reflectance % | Haze % | | | Azimuth angle φ deg | Vertical angle θ deg | Ratio of local reflection intensities % | Relative referance — | State of local reflection | Appearance of bright line |
| Ex. 14-1 | 67 | 8 | 1.0 | 0.65 | 31 | 0 | 20 | 32% | Comp. Ex. 3-1 | B | B |
| Ex. 14-2 | | | | | | 0 | 40 | 23% | Comp. Ex. 3-2 | B | B |
| Ex. 14-3 | | | | | | 0 | 60 | 11% | Cornp. Ex. 3-3 | B | B |
| Ex. 14-4 | | | | | | 15 | 20 | 31% | Comp. Ex. 3-4 | B | B |
| Ex. 14-5 | | | | | | 15 | 40 | 28% | Comp. Ex. 3-5 | B | B |
| Ex. 14-6 | | | | | | 15 | 60 | 9% | Comp. Ex. 3-6 | B | B |
| Ex. 14-7 | | | | | | 30 | 20 | 28% | Comp. Ex. 3-7 | B | B |
| Ex. 14-8 | | | | | | 30 | 40 | 22% | Comp. Ex. 3-8 | B | B |
| Ex. 14-9 | | | | | | 30 | 60 | 18% | Comp. Ex. 3-9 | B | B |
| Ex. 14-10 | | | | | | 45 | 20 | 29% | Comp. Ex. 3-10 | B | B |
| Ex. 14-11 | | | | | | 45 | 40 | 21% | Comp. Ex. 3-11 | B | B |
| Ex. 14-12 | | | | | | 45 | 60 | 14% | Comp. Ex. 3-12 | B | B |
| Ex. 14-13 | | | | | | 60 | 20 | 25% | Comp. Ex. 3-13 | B | B |
| Ex. 14-14 | | | | | | 60 | 40 | 25% | Cornp. Ex. 3-14 | B | B |
| Ex. 14-15 | | | | | | 60 | 60 | 17% | Comp. Ex. 3-15 | B | B |
| Ex. 15-1 | 67 | 8 | 1.0 | 0.65 | 31 | 0 | 20 | 23% | Comp. Ex. 3-1 | B | B |
| Ex. 15-2 | | | | | | 0 | 40 | 19% | Comp. Ex. 3-2 | B | B |
| Ex. 15-3 | | | | | | 0 | 60 | 14% | Comp. Ex. 3-3 | B | B |
| Ex. 15-4 | | | | | | 15 | 20 | 30% | Como. Ex. 3-4 | B | B |
| Ex. 15-5 | | | | | | 15 | 40 | 17% | Comp. Ex. 3-5 | B | B |
| Ex. 15-6 | | | | | | 15 | 60 | 11% | Comp. Ex. 3-6 | B | B |
| Ex. 15-7 | | | | | | 30 | 20 | 24% | Comp. Ex. 3-7 | B | B |
| Ex. 15-8 | | | | | | 30 | 40 | 26% | Comp. Ex. 3-8 | B | B |
| Ex, 15-9 | | | | | | 30 | 60 | 10% | Comp. Ex. 3-9 | B | B |
| Ex. 15-10 | | | | | | 45 | 20 | 22% | Comp. Ex. 3-10 | B | B |
| Ex. 15-11 | | | | | | 45 | 40 | 19% | Comp. Ex. 3-11 | B | B |
| Ex. 15-12 | | | | | | 45 | 60 | 12% | Comp. Ex. 3-12 | B | B |
| Ex. 15-13 | | | | | | 60 | 20 | 29% | Comp. Ex. 3-13 | B | B |
| Ex. 15-14 | | | | | | 60 | 40 | 17% | Comp. Ex. 3-14 | B | B |
| Ex. 15-15 | | | | | | 60 | 60 | 13% | Comp. Ex. 3-15 | B | B |
| Comp. Ex. 3-1 | 67 | 8 | 0.9 | 0.65 | 31 | 0 | 20 | | — | A | A |
| Comp. Ex. 3-2 | | | | | | 0 | 40 | | | A | A |
| Comp. Ex. 3-3 | | | | | | 0 | 60 | | | A | A |
| Comp. Ex. 3-4 | | | | | | 15 | 20 | | | A | A |
| Comp. Ex. 3-5 | | | | | | 15 | 40 | | | A | A |
| Comp. Ex. 3-6 | | | | | | 15 | 60 | | | A | A |
| Comp. Ex. 3-7 | | | | | | 30 | 20 | | | A | A |
| Comp. Ex. 3-8 | | | | | | 30 | 40 | | | A | A |
| Comp. Ex. 3-9 | | | | | | 30 | 60 | | | A | A |

TABLE 2-2-continued

|  | Optical property | | | Sunlight Shading coefficient | Upward reflectance of near infrared radiation % | Upward reflection directivity | | | | | |
|---|---|---|---|---|---|---|---|---|---|---|---|
|  | Visible light transmittance % | Visible light reflectance % | Haze % | | | Azimuth angle φ deg | Vertical angle θ deg | Ratio of local reflection intensities % | Relative reference | State of local reflection | Appearance of bright line |
| Comp. Ex. 3-10 |  |  |  |  |  | 45 | 20 |  |  | A | A |
| Comp. Ex. 3-11 |  |  |  |  |  | 45 | 40 |  |  | A | A |
| Comp. Ex. 3-12 |  |  |  |  |  | 45 | 60 |  |  | A | A |
| Comp. Ex. 3-13 |  |  |  |  |  | 60 | 20 |  |  | A | A |
| Comp. Ex. 3-14 |  |  |  |  |  | 60 | 40 |  |  | A | A |
| Comp. Ex. 3-15 |  |  |  |  |  | 60 | 60 |  |  | A | A |

<Resultant Results>
<<Visible Light Property, Sunlight Property, and Upward Reflection of Near Infrared Radiation>>

Like Comparative Example 3-1 to 3-15, Examples 14-1 to 14-15 and 15-1 to 15-15 also had comparable performance in transmittance of visible light, reflectance, Haze value, shading coefficient, and upward reflectance of near infrared radiation.

<<Reflection Directivity (Inhibition of Local Reflection)>>

It was confirmed that reflected light was not scattered and locally linearly reflected in Comparative Examples 3-1 to 3-15, but local reflection was inhibited in Examples 14-1 to 14-15 and 15-1 to 15-15.

It can be seen that local reflection was inhibited in the optical body of the present invention from a ratio of local reflection intensity of a relative value of reflection intensity of at the numerical value of the highest intensity except for specular reflection in the optical body of the present invention when considering the results of Comparative Examples obtained by reading the numerical value of the highest intensity except for specular reflection from a distribution of reflection intensities and measuring at the same azimuth angle and the same incident angle as 100%.

The bright line occurred due to regular structure when irradiated with the light source was more inhibited in the optical body of the present invention including reflection structural bodies of which heights are modulated in the extending direction than in Comparative Examples 3-1 and 3-15.

INDUSTRIAL APPLICABILITY

The optical body of the present invention may be suitably used as a heat-ray reflecting film which retroreflects sunlight when bonded onto a windowpane.

DESCRIPTION OF THE REFERENCE NUMERAL

10: optical body
11: first optical layer
12: inorganic layer
13: second optical layer
14: first base material

The invention claimed is:

1. A heat ray reflective optical body comprising:
a first optical layer which has a surface having a convex profile in which a plurality of one-directionally extending elongated convex portions are one-dimensionally aligned in one direction;
an inorganic layer disposed on the surface of the first optical layer on a side having the convex profile and
a second optical layer disposed on a side of the inorganic layer so that the convex profile is embedded;
wherein the convex profile meets at least one of the following (1), (2) and (4):
(1) a height varies periodically in an extending direction in each of the elongated convex portions and a period for which the height varies is between 400 μm and 1200 μm,
(2) a ridge portion meanders in a direction perpendicular to both the extending direction and a height direction of the convex portion in each of the elongated convex portions, and
(4) a triangular prism-shaped convex portion and an elongated convex portion having a curved surface are adjacent to each other.

2. The heat ray reflective optical body according to claim 1, wherein the inorganic layer is a wavelength selective reflecting layer.

3. The heat ray reflective optical body according to claim 1, wherein the inorganic layer is semitransparent.

4. The heat ray reflective optical body according to claim 1, wherein the first optical layer and the second optical layer have transparency.

5. The heat ray reflective optical body according to claim 1, wherein the optical body is bonded to a windowpane in use.

* * * * *